United States Patent [19]
Gulliford et al.

[11] Patent Number: 5,966,649
[45] Date of Patent: Oct. 12, 1999

[54] CELLULAR-TELEPHONE CENTRAL CALL-PROCESSING SYSTEM UTILIZING OBJECT-ORIENTED SOFTWARE IN ADJUNCT PERSONAL COMPUTER FOR GENERATING BILLING RECORDS

[75] Inventors: Philip Case Gulliford, Longwood; Christopher Craig Matthies, Casselberry; John Carter, Gainesville; Charles Tsao, Lake Mary, all of Fla.

[73] Assignee: Phoenix Wireless, Inc., Maitland, Fla.

[21] Appl. No.: 08/706,636

[22] Filed: Sep. 6, 1996

[51] Int. Cl.⁶ .................................................. H04Q 7/22
[52] U.S. Cl. ........................................................ 455/408
[58] Field of Search .................................. 455/405–408, 455/419, 445

[56] References Cited

U.S. PATENT DOCUMENTS

| | | | |
|---|---|---|---|
| 5,109,401 | 4/1992 | Hattori et al. | 455/407 |
| 5,195,090 | 3/1993 | Bollinger et al. | 370/94.1 |
| 5,517,555 | 5/1996 | Amadon et al. | 455/408 |
| 5,566,227 | 10/1996 | DeVaney | 379/59 |
| 5,592,535 | 1/1997 | Klotz | 455/406 |
| 5,619,551 | 4/1997 | Yahagi | 370/60 |
| 5,659,601 | 8/1997 | Cheslog | 455/406 |
| 5,666,399 | 9/1997 | Bales et al. | 455/419 |
| 5,673,306 | 9/1997 | Amadon et al. | 455/406 |

*Primary Examiner*—Andrew M. Dolinar
*Attorney, Agent, or Firm*—Hamman & Benn

[57] ABSTRACT

An adjunct processor for a wireless telephone system utilizes object-oriented software for providing a common air-interface protocol for each cell site's base station, so that, regardless of the specific cellular system. it may be coupled to the central, adjunct node-processor of the invention, so that multifarious-operating cellular systems may be linked by the central personal computer adjunct node-processor into one holistic system comprised of many different cellular operating systems and of many node-processors. A network of many adjunct node-processors allows hand-off between adjunct processors, to that if one adjunct processor fails or is down, another adjunct processor in the network may take over its functions. Each adjunct processor also has an alarm-management system and a billing and accounts-management system, which may take over the same systems another, down adjunct processor. Each component is comprised of an objects-oriented software and a state table, with the objects-oriented software creating a pointer for the state table. The billing function is continuous during the processing of the call, so that, if the available credit for a user has expired while a call is in progress, that call is automatically terminated.

5 Claims, 10 Drawing Sheets

CELLULAR-TELEPHONE CENTRAL CALL-PROCESSING SYSTEM UTILIZING OBJECT-ORIENTED SOFTWARE IN ADJUNCT PERSONAL COMPUTER FOR GENERATING BILLING RECORDS

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

BACKGROUND OF THE INVENTION

The present invention is directed to a central call-processing system for a cellular or cellular-like telephone system.

The increasing availability of mobile and portable communications over the past decade has freed business and residential users from the physical constraints of a wholly wired telecommunications network. Cellular communications systems, together with paging and other complementary services, has brought mobility to telecommunications services for the first time. Significant technical advances in mobile and portable technologies, as well as in new technologies such as digital transmission with respect to wireless telecommunications, have substantially expanded the number and types of wireless telecommunications services using the cellular spectrum that can be made available to the user. These prospective services include, but are not limited to, advanced forms of cellular telephone service, advanced digital cordless telephone service, portable facsimile services, wireless private branch exchange services, and wireless local area network services, and may be used through the existing public switched network or through alternative local wired networks (such as cable television systems). As such, digital personal communications systems can exist independently of local wired networks, filling gaps that are existing in current communications systems, and also in creating new markets many yet to be defined. Accordingly, providers of cellular systems, including Personal Communication Systems (PCS), will have the ability to reach and serve existing and new markets, both nationally and globally, in an economic and responsive manner. According to the invention, it is advantageous to construct a hybrid cellular system, that may include a PCS, that is fully compatible with any and all open network interface requirements that may currently exist, or are expected to exist in the future, such that a number of different, hithertofore incompatible cellular systems may be linked together by means of one central processor using multiple common air-interface protocols. Thus, for example, a provider of an Advanced Mobile Phone Service (AMPS) analog cellular phone system, with its one or more base stations and local cellular customers, may be directly and wirelessly linked, for example, to a provider of the Global System for Mobile Communications (GSM) digital cellular system, or, either or both of the above may be linked to a provider of the Nordic Mobile Telephone (NMT) 450 Mhz.-frequency cellular system, or to a provider of the Extended Total Access Cellular System (E-TACS).

Each of the above-mentioned cellular systems has its own specifications and protocols that have hithertofore prevented ready and easy coupling of one system with another system, which has prevented a cellular call from one type of system to be made to another type of system without having to be first routed through the public switched telephone network (PSTN).

Traditional, wireless communication systems, such as those named above, typically implement the call-control and real-time operational activities in the actual switching exchange equipment connected to the PSTN, while all other activities are handled in an external, dedicated, adjunct platform computer. Such systems must route their calls through the PSTN, if a call is being made to another type of cellular system, as above-described. Since the call-control and real-time operational activities are embedded in the actual switching exchange equipment, any upgrade or change to the system is considerably time-consuming and costly, often necessitating replacement of switching equipment hardware.

Owing to the fact that conventional cellular systems require such switching-equipment control, such systems require very complicated and decentralized billing schemes. These prior-art systems rely on external billing computer platforms to process call detailing information. This information is typically downloaded only once or twice a month to the cellular provider. Therefore, the time period between a placement of a call and the time that the call is billed may be a month or so, often allowing a subscriber to surpass his prescribed monthly call-limit.

Traditional cellular systems require separate and specific processing platforms to support the mobility and network administration functions of the system, and thus require duplication of such platforms to provide back-up capability.

SUMMARY OF THE INVENTION

The present invention is a marked improvement over these prior-art systems and the limitations described above that are inherent in them. The invention utilizes object-oriented software for providing a common air-interface protocol for each cell site's base station, so that, regardless of the specific cellular system, it may be coupled to the central personal computer adjunct node-processor of the invention, so that multifarious-operating cellular systems may be linked by the central personal computer adjunct node-processor into one holistic system comprised of many different cellular operating systems and of many node-processors.

Also, according to the invention, each central personal computer adjunct node-processor controls the connections of each call made to a linked base station, whether the call is to another cell-site within the overall system, whereby the call need not be passed to the PSTN, or whether the call is made to a telephone subscriber serviced only by the PSTN.

Since the central personal computer adjunct node-processor controls all call-connections of each cell-site, any and all billing information may be, and is, carried out at each central personal computer adjunct node-processor, so that relatively instantaneous subscriber-status information may be had, whereby call-limits, and the like, are prevented from being exceeded. The billing function is continuous during the processing of the call, so that, if the available credit for a user has expired while a call is in progress, that call is automatically terminated.

Since each central personal computer adjunct node-processor of any one hub uses the same platform, many nodes of different hubs may be connected together. Since each central personal computer adjunct node-processor of a hub performs all of the mobility functions required by the system's hub of which it is part, such as call hand-off, roaming, etc., the functions of any one central personal computer adjunct node-processor may be taken over by a central personal computer adjunct node-processor of another hub, so that upon a central personal computer adjunct node-processor's breakdown, another central personal computer adjunct node-processor of a different hub may temporarily take over its processing functions.

BRIEF DESCRIPTION OF THE DRAWINGS

The invention will be more readily understood with reference to the accompanying drawing, wherein.

DETAILED DESCRIPTION OF THE INVENTION

Figure 1:
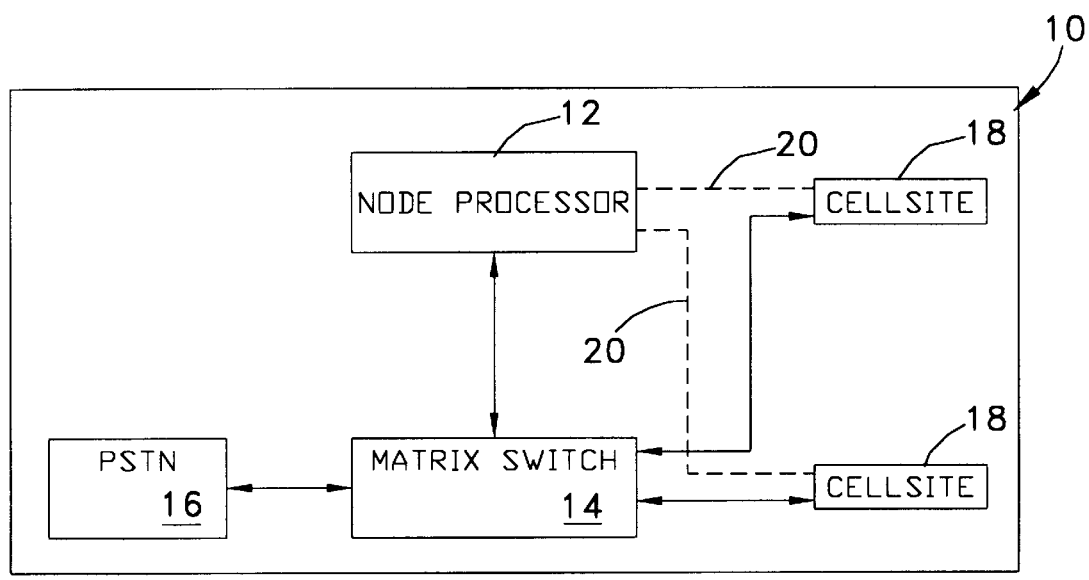
FIG. 1 is a block diagram of a node of the wireless telephone system of the invention.

Referring now to the drawings in greater detail, FIG. 1 shows a block diagram of the wireless cellular node-system 10 of the invention, in which the novel software of the invention is employed. The system 10 is comprised of at least one hub, and preferably many hubs forming a network, each hub having a central personal computer adjunct node-processor 12, which in the preferred embodiment, is a Sun Sparc 10 workstation based on UNIX operating system. The node-processor 12 is the system-controller of the hub, and performs all of the central functions of the hub, as detailed below, including all billing and call-handling functions. The remaining hardware of the hub is a matrix switch 14 coupled between the adjunct node-processor 12 and the PSTN 16. The matrix switch 14 is conventional, such as LNX 2000 matrix switch, manufactured by Excel, Inc. of Hyannis, Mass. The actual link between the matrix switch and the PSTN is based on a time-division multiplex pulse-code modulation and delta modulation, well-known to those skilled in the art. The matrix switch is connected by wire or microwave link to a plurality of cell-sites 18, 18'. According to the invention, each cell-site may be of a different protocol from that of another. For example, the cell-site may be a base station of a GSM system, while the cell-site 18' may be a base station associated with an AMPS-based system or an E-TACS system. Since, as described below, the object-oriented software of the invention provides what may be called a generic interface process, all cellular systems may be readily and easily connected together, and controlled by a central personal computer adjunct node-processor 12. The central personal computer adjunct node-processor 12 is linked to cell-sites 18, 18' preferably by the same physical connection that links the matrix switch 14 with the cell-sites, or may be separate wiring 20.

The central personal computer adjunct node-processor 12 handles all aspects of call-processing. Calls from the PSTN users 16 are delivered to the matrix switch 14 via central-office trunks. The matrix switch 14 receives the digits of the telephone number to be called and serviced by the central personal computer adjunct node-processor 12, which digits are forwarded to the central personal computer adjunct node-processor 12. The adjunct node-processor 12 performs a number of checks to verify that the destination is valid, and is allowed to receive the call, or is not currently busy. Once validated, the adjunct node-processor 12 instructs the base-station's transceiver (BTS) to transit a page-message over the hailing channel to the destination-mobile phone. If the message is received, the mobile phone confirms the page, and is directed to tune to the desired voice channel frequency, in the conventional manner. The mobile phone is then in an "alert" state, and starts ringing. If the call is then answered, the base station indicates to the adjunct node-processor 12 that the mobile phone has gone off-hook. At this time, the adjunct node-processor computer 12 instructs the matrix switch 14 to connect the inbound central office call to the audio trunk of the base station, thereby connecting the call. The adjunct node-processor 12 also logs the call-information, including the start-time and the user-number.

If a call is originated by a user of the wireless system itself, the mobile phone sends an inbound message to its base station, indicating a request for service. The base station responds by either allocating a voice channel for the call and directing the mobile unit to that voice channel, if the call destination is to another mobile unit serviced by the adjunct node-processor 12 of that hub or of a different hub. If the destination is a number serviced by PSTN 16, then the base station forwards the request to the node processor 12 for validation, which instructs the base station what voice channel to use. The adjunct node-processor than instructs the matrix switch 14 to seize an outbound trunk to PSTN, and dials the digits of the destination-party. The adjunct node-processor then directs the switch to connect the base station's audio trunk to the outbound trunk, in the conventional manner, whereby the mobile-phone user may hear the call-progress tones from the network, such as busy or ringing. When the call is terminated, the adjunct node-processor opens the call-information record files used to log the call-details for billing purposes, as discussed in greater detail hereinbelow.

Figure 2:
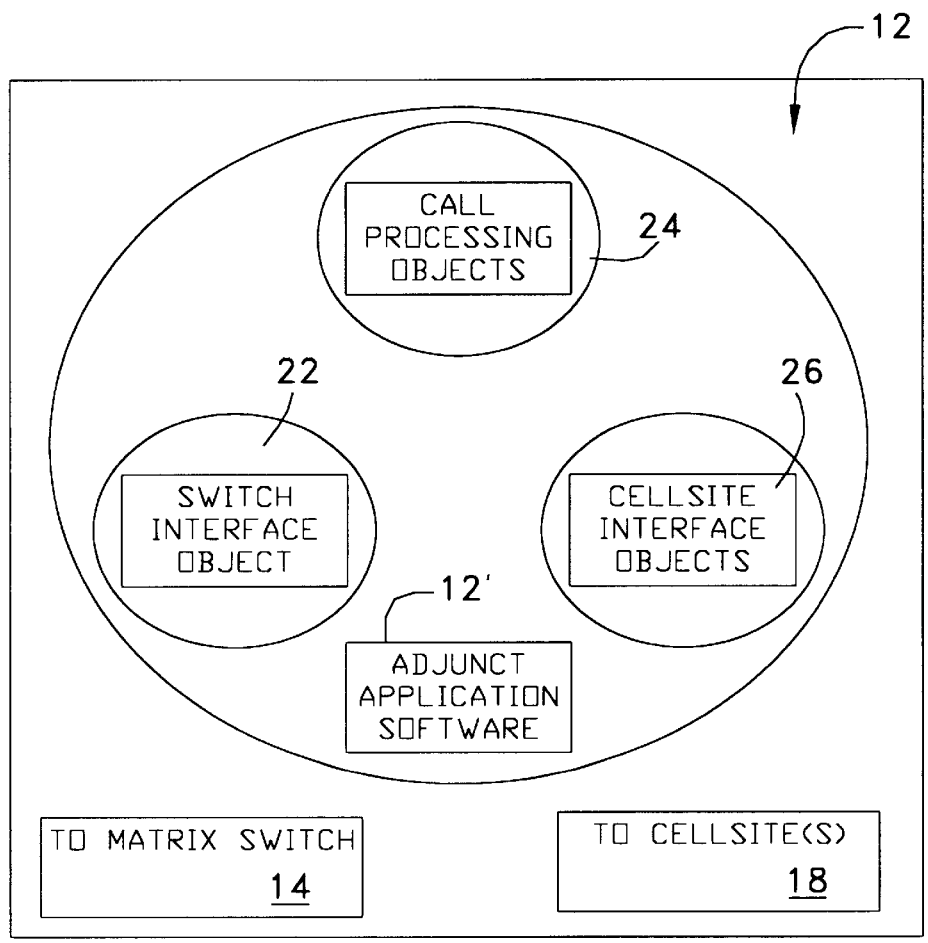
FIG. 2 is a block diagram showing the component-parts of the objects-oriented software of the adjunct node-processor.

Referring to FIG. 2, the adjunct node-processor 12 is controlled by specific object-oriented software 12' consisting of a number of component-parts created by UNIX processes. These component-parts are: A matrix-switch interface object software 22 that is used to interface and communicate with the matrix switch 14; call-processing object software 24 containing the necessary data and functions to control all high-level aspects of call-control; and multiple cell-site interface object software 26 allowing the system to accommodate a diverse set of cell-sites using different specifications and protocol. The software listing for these programs are shown hereinbelow.

Each call-event is delivered to the "Call-Objects" component 24 of the software fro message received from the matrix switch interface software 22 and cell-site interface software 26. The "Call-Objects" program maintains a pointer for each current call which references the current state of the call in a table called "Call-State Table". The "Call-State Table" defines the sequence of states and actions taken for a call, based on events received. The subscriber data base is the repository of all subscriber's pertinent information, such as phone number, and service profile. Call-events delivered to the "Call Objects" program invoke methods which cause the program to perform the actions specified in the "Call-State Table", and to move the pointer to the next, defined state.

Figure 3A:
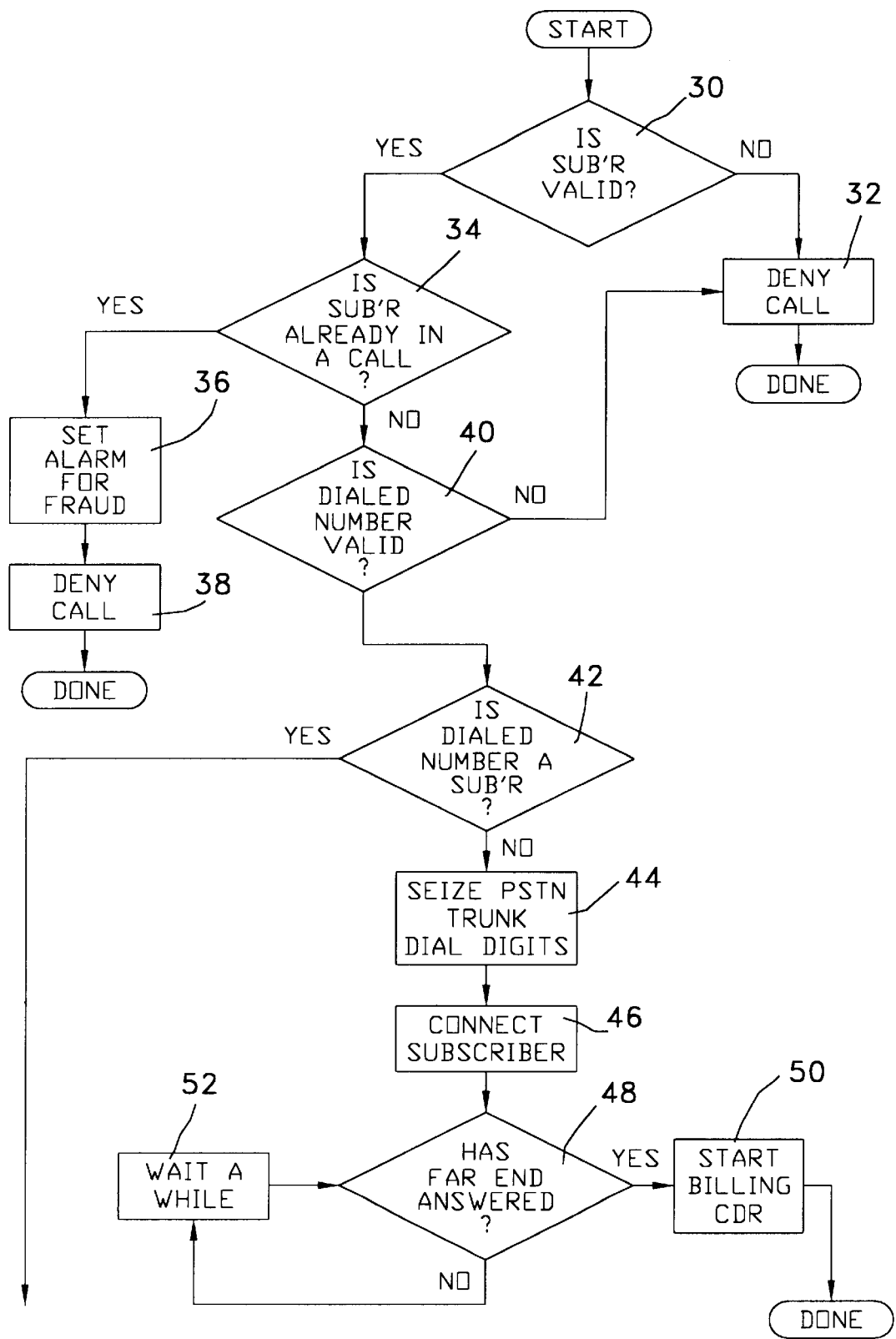
FIGS. 3A–4C are flow charts showing the call-processing component of the objects-oriented software of the adjunct node-processor.
Figure 3B:
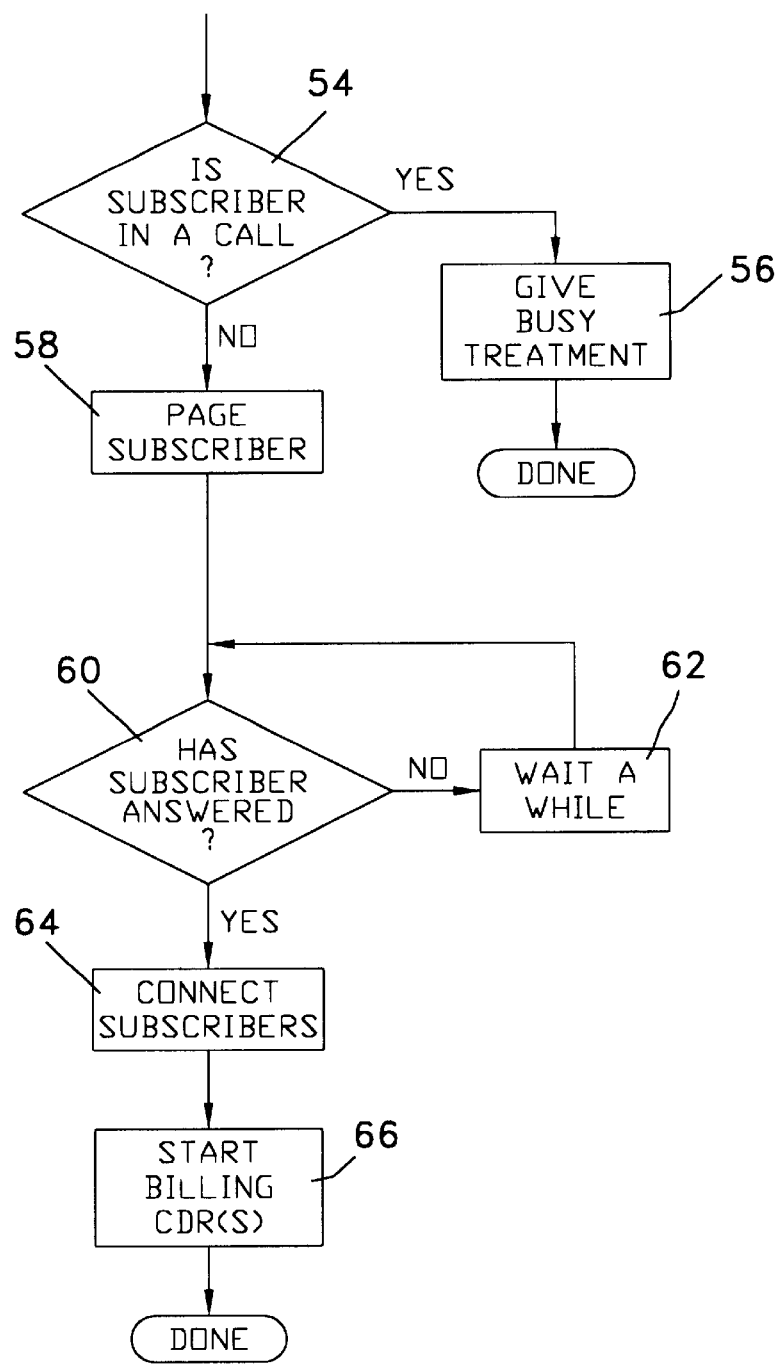

Referring now to FIGS. 3 and 4, there are shown flow charts depicting the events performed by the above-described software application-components of the adjunct node-processor 12. FIGS. 3A and 3B deal with the case when the mobile-subscriber is the originator of the call. The "Call-Processing Objects" software determines if the subscriber is a valid one (Block 30). If not, the call is denied (block 32). If it is a valid call, then the software determines if that subscriber is already in a call (step 34), and if YES, then an alarm is set (block 36) indicating fraud, and the call is denied (block 38). If the subscriber is not in a call, then the number dialed by the subscriber is checked to see if it is valid (step 40), and if NO, then the call is denied (block 32). If the number is valid, then the applications program will determine if the dialed, or called, number is also a subscribe or not (step 42). If NO, then the adjunct node-processor instructs the matrix switch 14 to seize a PSTN trunk line and to dial out the digits to the PSTN (block 44). Thereafter, the call is connected (block 46), and then the program determines if the call has been answered by the called party (step 48). If YES, then the adjunct node-processor starts the billing process (block 50). If NO, then a waiting period is commenced (block 52). If after a preset time period the call is not answered, the adjunct node-processor will instruct the matrix switch to disconnect.

Referring to FIG. 3B, if the called party is also a subscriber serviced by the adjunct node-processor 12, then the call-processing objects application software of the adjunct node-processor will determine if the called subscriber is already on a call (step 54). If YES, then a busy signal is generated locally by the adjunct node-processor (block 56). If NO, then that called mobile subscriber is paged by signaling the base station associated with that subscriber from the adjunct node-processor 12 (block 58). The program then determines if the called subscriber has answered (step 60), and if NO, then a waiting period is generated to give time for answering (block 62). When the called subscriber answers, the two subscribers are connected together ((block 64) by means of the adjunct node-processor, and bypassing the matrix switch, regardless of the type and specifications of the cellular systems of the two subscribers. After connection, the adjunct node-processor starts the billing (block 66).

Figure 4A:
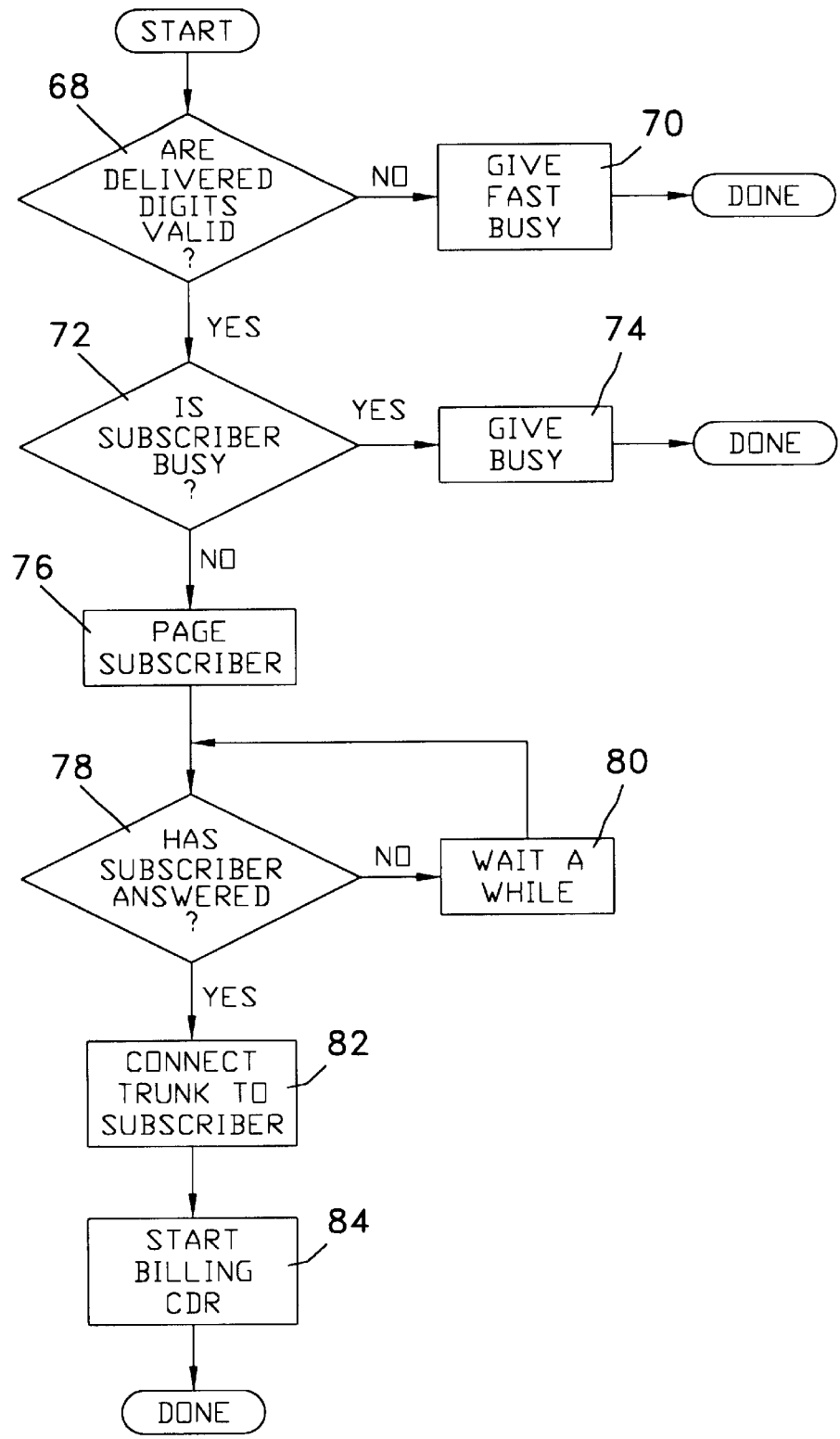

Referring now to FIGS. 4A, there is shown what steps the call-processing objects application software of the adjunct node-processor 12 performs if the originating call is from a PSTN user. The adjunct node-processor first determines if the digits called are valid (step 68), and if not valid, then a fast busy-signal is generated (block 70). If the digits are valid, then the adjunct node-processor determines if the called subscriber's mobile phone is busy (step 72). If YES, then a regular busy-signal is generated (block 74). If the called subscriber's phone is not busy, then that called mobile subscriber is paged by signaling the base station associated with that subscriber from the adjunct node-processor 12 (block 76). The program then determines if the called subscriber has answered (step 78), and if NO, then a waiting period is generated to give time for answering (block 80). When the phone is answered, the PSTN trunk line is connected via the matrix switch 14 to the base station servicing the called subscriber (block 82), and the adjunct node-processor 12 starts the billing period (block 84).

Figure 4B:
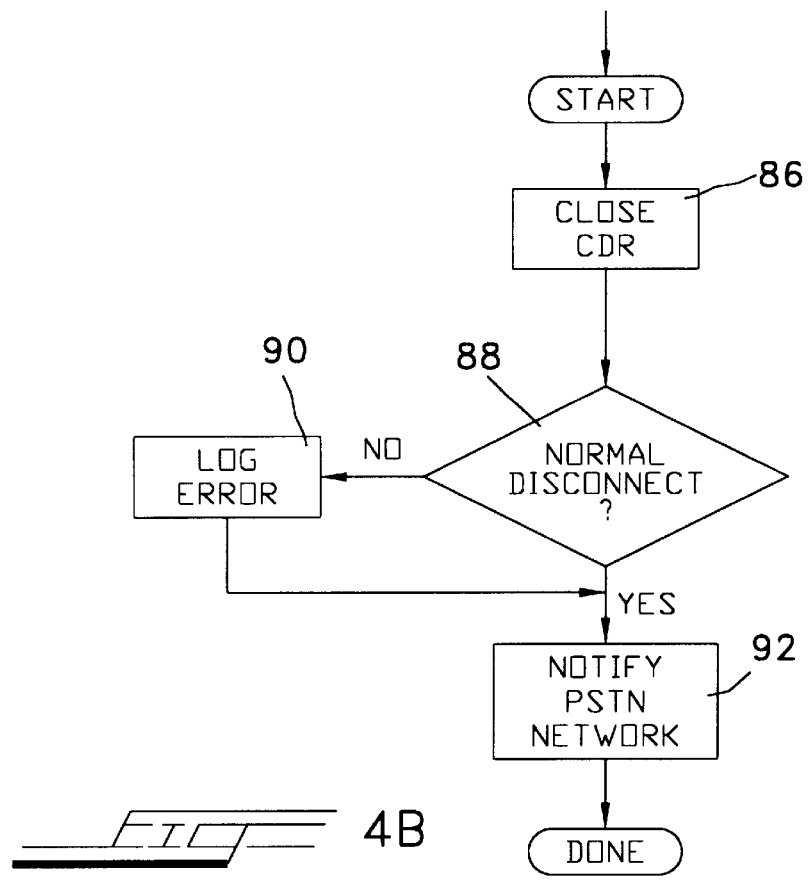
Figure 4C:
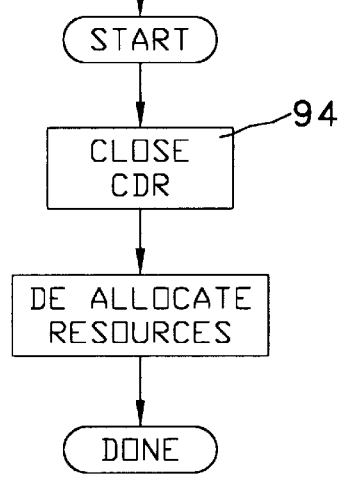

FIGS. 4A and 4B show the steps involved when the call is terminated for both PSTN-initiated calls and subscriber-initiated calls. If the subscriber terminates the call, then the adjunct node-processor 12 stops the billing period (block 86), and the call is disconnected. The applications software of the adjunct node-processor 12 determines if there was normal disconnect (step 88), and if NO, then a log-error is indicated (block 90), and the PSTN notified (block 92). If the PSTN-party hangs up, then the billing by the adjunct node-processor 12 is also stopped (block 94, FIG. 4C).

The following is the source code listing of the call-processing objects application of the adjunct node-processor 12 for carrying out the above-described steps. In the software listing, there is reference to "State Table", which is the state machine described and discussed hereinbelow in detail.

To:       gullifor @ pwgi.com @ inet
cc:       (bcc: Dan Gulliford/Phoenix Wireless Group Inc)
From:     chris @ wormhole.pwgi.com (Chris Matthies) @ inet
Date:     06/03/96 04:07:28 PM
Subject:  patent

- - - - - - - - - -
X-Sun-Data-Type: text
X-Sun-Data-Description: text
X-Sun-Data-Name: text
X-Sun-Charset: us-ascii
X-Sun-Content-Lines: 1

Here is some stuff hope it helps.
- - - - - - - - - -
X-Sun-Data-Type: default
X-Sun-Data-Description: default
X-Sun-Data-Name: junk.dat
X-Sun-Charset: us-ascii
X-Sun-Content-Lines: 335

```
//-----------------------------------------------------------
void
CallRecords::ex2cp_req_for_service_with_addr()
{
        char *where = "CallRecords::ex2cp_req_for_service_with_addr: (IPC) ";

// extract the incoming call message
        ipc->get_msg();

// get the elements of the IPC message
        int seqnum;
        char *dialnumber;
        char *dialednumber;
        *ipc >> seqnum >> dialednumber >> dialnumber;

OTCLIB_TRACER(WCP >= 1) << endl << where << timestamp() << endl;
        OTCLIB_TRACER(WCP >= 1) << " Incoming Call - Trunk to Mobile" << endl;
        OTCLIB_TRACER(WCP >= 1) << "  sequence number: " << seqnum << endl;
        OTCLIB_TRACER(WCP >= 1) << "  dial number: " << dialnumber << endl;
        OTCLIB_TRACER(WCP >= 1) << "  dialed number: " << dialednumber << endl;

// generate a unique call id
        IdType callId;
        IdType timerId;
```

```
callId = Call::callIdCount > 65000 ?
        Call::callIdCount = 1, Call::callIdCount++ : Call::callIdCount++;
timerId = Call::timerIdCount > 65000 ?
        Call::timerIdCount = 1, Call::timerIdCount++ : Call::timerIdCount++;

// send callid immediately to the excel
ipc->create_msg();
*ipc << callId << seqnum;
ipc->send_msg("cp2excReqForServiceWithAddrAck");

// create a call record for this call
//              swCallId = portNumber
Call *call = new Call(TRUNK_TO_MOBILE, 0, callId, timerId, 0, "",
                                dialednumber, dialnumber, "", "", "", -1);

_guimsg.trace(call,"%s%s Incoming Call - T->M dial: %s dialed: %s callid: %u\n",
                where, timestamp(), dialnumber, dialednumber,
call->callid());

// print out timer info
call->printTimer(where);

// insert the call record in the call record table
insert_cid(call->callid(), call);

// remove all calls that are aged, an aged call has same dial number as the incoming call
//OTCLIB_TRACER(WCP >= 2) << " removing all AGED records with dial number: "
//                << dialnumber << endl;
//remove_dialnum_callrec(dialnumber, callid);

// send the call to the gui and increment stats
_guimsg.display_call(call);
callStatsMsgKit->increment_calls();

// start speech timer
call->start_speech_timer();

// send event to the state table
call->event(INCOMING_CALL);
}
// method binding structure for use in action mapping for state table
static SemActionRec call_bd_rec[] = {
    {"LookUpLib",       (SEM_action_memfnp)&Call::LookUpLib},
    {"CheckMobileBusy", (SEM_action_memfnp)&Call::CheckMobileBusy},
    {"PageRequest",     (SEM_action_memfnp)&Call::PageRequest},
    {"NoOp",            (SEM_action_memfnp)&Call::NoOp},
```

```
{"SleepMicro",            (SEM_action_memfnp)&Call::SleepMicro},
{"SleepSeconds",          (SEM_action_memfnp)&Call::SleepSeconds},
{"SleepSeconds1",         (SEM_action_memfnp)&Call::SleepSeconds1},
{"SleepSeconds2",         (SEM_action_memfnp)&Call::SleepSeconds2},
{"SendRelReq",            (SEM_action_memfnp)&Call::SendRelReq},
{"CallCleanUp",           (SEM_action_memfnp)&Call::CallCleanUp},
{"SendRelConf",           (SEM_action_memfnp)&Call::SendRelConf},
{"Validate",              (SEM_action_memfnp)&Call::Validate},
{"SendAccept",            (SEM_action_memfnp)&Call::SendAccept},
{"SendDeny",              (SEM_action_memfnp)&Call::SendDeny},
{"LookUpCircuit",         (SEM_action_memfnp)&Call::LookUpCircuit},
{"ConverDialedNumToMin",  (SEM_action_memfnp)&Call::ConverDialedNumToMin},
{"Speech",                (SEM_action_memfnp)&Call::Speech},
{"Teardown",              (SEM_action_memfnp)&Call::Teardown},
{"CstaDivertToRingBack",  (SEM_action_memfnp)&Call::CstaDivertToRingBack},
{"CstaDivertToEM",        (SEM_action_memfnp)&Call::CstaDivertToEM},
{"CstaDivertToBusy",      (SEM_action_memfnp)&Call::CstaDivertToBusy},
{"CstaDivertToReorder",   (SEM_action_memfnp)&Call::CstaDivertToReorder},
{"CstaMakeCall",          (SEM_action_memfnp)&Call::CstaMakeCall},
{"CstaClearCall",         (SEM_action_memfnp)&Call::CstaClearCall},
{"CstaAckCallId",         (SEM_action_memfnp)&Call::CstaAckCallId},
{"BeginBilling",          (SEM_action_memfnp)&Call::BeginBilling},
{"EndBilling",            (SEM_action_memfnp)&Call::EndBilling},
{"ExOutSeize",            (SEM_action_memfnp)&Call::ExOutSeize},
{"ExLocalSeize",          (SEM_action_memfnp)&Call::ExLocalSeize},
{"ExConnect",             (SEM_action_memfnp)&Call::ExConnect},
{"ExReleaseChannel",      (SEM_action_memfnp)&Call::ExReleaseChannel},
{"ExReleaseSepChannel",   (SEM_action_memfnp)&Call::ExReleaseSepChannel},
{"ExConnectRingBackPattern", (SEM_action_memfnp)&Call::ExConnectRingBackPattern},
{"ExConnectBusyPattern",  (SEM_action_memfnp)&Call::ExConnectBusyPattern},
{"ExConnectReOrderPattern", (SEM_action_memfnp)&Call::ExConnectReOrderPattern},
{"ExDisConnectTonePattern", (SEM_action_memfnp)&Call::ExDisConnectTonePattern},
{"ExGenCallProcEvent",    (SEM_action_memfnp)&Call::ExGenCallProcEvent},
{"ExRecAnnounceConnect",  (SEM_action_memfnp)&Call::ExRecAnnounceConnect},
{"Counter",               (SEM_action_memfnp)&Call::Counter},
{0, 0   }
};

#ifdef min
#undef min
#endif

// static variables....
IdType  Call::callIdCount = 1;
IdType  Call::timerIdCount = 1;
```

```
long    Call::setupTime    = 45;
long    Call::teardownTime = 45;
short   Call::isInit       = 0;
SPString Call::basePath    = "";

// ------------------------------------------------------------
Call::Call(const int callType, const int bts, const IdType cid, const IdType tid,
           const IdType bportNum, const char *portNum, const char* dialedNum,
           const char* dialNum, const char *mn, const char *emD, const char *en,
           const short circ):
    callId(cid),
    timerId(tid),
    portNumber(portNum),
    dialNumber(dialNum),
    dialedNumber(dialedNum),
    emDigits(emD),
    min(mn),
    esn(en),
    acctCode("0000"),
    readyForDisplay(0),
    btsportNumber(bportNum),
    callSetupTime(0),
    callTearDownTime(0),
    callStatus(""),
    acceptProfTimer(0),
    _cleanuploh(0),
    _specialCall(0),
    _billRc(0),
    _gui(callRecs.gui()),
    _cdr(callRecs.cdr()),
    callState(-1)
{
    char *where = "Call::Call ";

circuit[0]   = circ;
    circuit[1]   = 0;
    btsNumber[0] = bts;
    btsNumber[1] = -1;

// init the environment variables
    _initenv();

// create a state event matrix for this call
    // using the call type to determine which table to pass to
    // the state machine
    typeOfCall = callType;
```

```
        callSetupTime    = time((time_t *)0);
        switch (callType) {
                case TRUNK_TO_MOBILE:    // trunk to mobile call
                sem = new Sem(trunk2mobileTbl, WACS_IDLE, this); // create SEM object
using trunk to mobile state table
                break;
                case MOBILE_TO_TRUNK:    // mobile to trunk call
                sem = new Sem(mobile2trunkTbl, WACS_IDLE, this); // create SEM object
using mobile to trunk state table
                break;
                case MOBILE_TO_MOBILE:    // mobile to mobile call
                sem = new Sem(mobile2mobileTbl, WACS_IDLE, this); // create SEM object
using mobile to mobile state table
                break;
        }
        // setup call timers, send this new call to the gui is debug on
        initialize_timers();
        call_data_gui();
        sem->set_trace_proc(tracer);
}

//------------------------------------------------------------
Call::Call(const int callType)
        : callId(0),
          timerId(0),
          readyForDisplay(0),
          btsportNumber(0),
          _specialCall(1),
          acceptProfTimer(0),
          _cleanupIoh(0),
          _gui(callRecs.gui()),
          _cdr(callRecs.cdr()),
          callState(-1)
{
        char *where = "Call::Call ";

circuit[0]   = 0;
        circuit[1]   = 0;
        btsNumber[0] = -1;
        btsNumber[1] = -1;

// init the environment variables
        _initenv();

// get the base path for the data files
        SPString assocStateData    = basePath;
```

```
assocStateData        += "/config/TrkMobileStates.h";
SPString assocStateDataCmp = basePath;
assocStateDataCmp     += "/config/TrkMobileStates.state.h.comp";
SPString assocEventDataCmp = basePath;
assocEventDataCmp     += "/config/TrkMobileStates.event.h.comp";

// create a state event matrix for this call
// using the call type to determine which table to pass to
// the state machine
SPString stateTable;
SPString stateTableCmp;
switch (callType) {
        case TRUNK_TO_MOBILE:    // trunk to mobile call // create a SEM object using the trunk to mobile state table
        sem = new Sem(trunk2mobileTbl, WACS_IDLE);

// get the name and location of the trunk to mobile state table
        stateTable    = basePath;
            stateTable        += callRecs.tr2mb_name();
        stateTableCmp     = stateTable + ".comp";

sem->compile_table(assocStateData, call_bd_rec, stateTable,
                                   stateTableCmp, assocStateDataCmp,
assocEventDataCmp);

break;

case LOAD_TRUNK_TO_MOBILE:    // trunk to mobile call from a file

// create a SEM object using the trunk to mobile state table in a compile
form
        sem = new Sem(trunk2mobileTbl, WACS_IDLE);

// get the name and location of the trunk to mobile state table
        stateTable    = basePath;
            stateTable        += callRecs.tr2mb_name();
        stateTableCmp     = stateTable + ".comp";

sem->load_state_table(stateTableCmp, call_bd_rec);
                sem->load_assoc_table(assocStateDataCmp, assocEventDataCmp);

break;

case MOBILE_TO_TRUNK:    // mobile to trunk call
```

```
            // create a SEM object using the trunk to mobile state table
    sem = new Sem(mobile2trunkTbl, WACS_IDLE);

// get the name and location of the trunk to mobile state table
            stateTable      = basePath;
                stateTable          += callRecs.mb2tr_name();
            stateTableCmp       = stateTable + ".comp";

sem->compile_table(assocStateData, call_bd_rec, stateTable,
                                stateTableCmp, assocStateDataCmp,
assocEventDataCmp);

break;

case LOAD_MOBILE_TO_TRUNK:      // mobile to trunk call

// create a SEM object using the trunk to mobile state table in a compile
form
            stateTable      = basePath;
                stateTable          += callRecs.mb2tr_name();
            stateTableCmp       = stateTable + ".comp";
    sem = new Sem(mobile2trunkTbl, WACS_IDLE);

// get the name and location of the mobile to trunk state table
            sem->load_state_table(stateTableCmp, call_bd_rec);
            sem->load_assoc_table(assocStateDataCmp, assocEventDataCmp);

break;

case MOBILE_TO_MOBILE:      // mobile to mobile call

// create a SEM object using the mobile to mobile state table
    sem = new Sem(mobile2mobileTbl, WACS_IDLE);

// get the name and location of the mobile to mobile state table
            stateTable      = basePath;
                stateTable          += callRecs.mb2mb_name();
            stateTableCmp       = stateTable + ".comp";

sem->compile_table(assocStateData, call_bd_rec, stateTable,
                                stateTableCmp, assocStateDataCmp,
assocEventDataCmp);

break;

case LOAD_MOBILE_TO_MOBILE:     // mobile to mobile call
```

```
        // create a SEM object using the to mobile state table in a compile form
        stateTable    = basePath;
        stateTable    += callRecs.mb2mb_name();
        stateTableCmp = stateTable + ".comp";
        sem = new Sem(mobile2mobileTbl, WACS_IDLE);

// get the name and location of the mobile to trunk state table
        sem->load_state_table(stateTableCmp, call_bd_rec);
        sem->load_assoc_table(assocStateDataCmp, assocEventDataCmp);

break;

}

}
//------------------------------------------------------------
Call::~Call(){

// remove all gui call entries
    if ( ipc && !_specialCall ) {
        _gui.remove_call_callid(this);
        if ( btsNumber[0] != -1 )
callStatsMsgKit->update_rfstats_gui(btsNumber[0]);
        if ( btsNumber[1] != -1 )
callStatsMsgKit->update_rfstats_gui(btsNumber[1]);
            callStatsMsgKit->update_swstats_gui();
            callStatsMsgKit->update_sysstats_gui();
    }

// remove the state machine
    if ( sem )
        delete sem;

if ( acceptProfTimer )
        delete acceptProfTimer;

// remove dispatched timers
    if ( _cleanuploh ) {
        OTCLIB_TRACER(WCP >= 2) << " DESTRUCTOR removing all timers " << endl;
        remove_call_timers();
        delete _cleanuploh;
    }

}
```

As mentioned above, traditional wireless, telephony communication systems typically implement call control and real-time operational activities in software that execute on switching exchange equipment. The intelligence of those systems is effectively embedded in software source code, and is not expressed explicitly. As a result, changes to call processing, for example, to provide new customer service or features, often require extensive changes to the software at the switching exchange equipment. In contrast, the system of the invention uses a different and unique approach to the issue of implementing call-processing system intelligence in a software-defined architecture.

Call processing in the wireless telephony system of the invention requires that the system perform specific tasks and provide certain responses or actions as a result of the defined stimuli. These stimuli are typically external requests for service from users. A model of the system as a call-state machine is created. In this call-state machine, a discrete, finite set of states defines all possible conditions for the system. A stimulus or event typically causes a change in state, as well as initiating the machine to generate appropriate responses. For example, assuming the system of the invention is in an "idle" state, an event such as call origination from the PSTN, as discussed above in reference to FIG. 4A, may be received. The "Call-Processing Objects" software determines then enters a state to determine the validity of the called party state, and performs the defined response, which, in this case, is to send an appropriate acknowledgment-message back to the PSTN. Thus, this call-processing may be expressed in tabular form as:

| Current State | Event | Next State | Action |
|---|---|---|---|
| Idle | PSTN Originate | Validate | Ack. |

Unlike traditional call-processing software, where the events and actions are typically executed as a "if-then-else" method, used in languages such as C, Pascal, etc., the software of the invention utilizes a "Call-State Table" that is stored as an ASCII file. According to the invention, the "Call-State Table" is comprised of three distinct tables; one for each of the defined call types, i.e. mobile-to- mobile, mobile-to-PSTN-network, and PSTN-network-to-mobile. When the system is first started up, the system scans the entire contents of the state-file, and builds a compiled, complex data array in memory. The array contains a location for each of the defined call-states in the table, as well as response-function pointers (execution addresses) for the defined response routines.

When a call is first initiated on the system, the software's call-processing object creates a pointer to the table, which tracks the current state of the call. Other calls occurring simultaneously on the system are allocated their own unique pointer by the call-processing object, which may or may not point to the same state. This use of pointers eliminates the need to replicate the table in its entirety for each call in the system. When an event for a call-in-progress is received, the call-object software first determines which call (out of many possible calls current on the system) is involved; then, using the current-state pointer for that call, queries the call-state table to determine what state to advance the current state-pointer, along with what response-actions(s) are to be performed. Assuming that the event is valid for the current state, the call-processing object software performs the necessary actions, and updates the current state-pointer accordingly. If the event is determined to be invalid (perhaps a nonsensical event, e.g. a "hang up" from a mobile before it has been told to ring), the call-object performs appropriate standard error-treatment, which usually means premature call tear-down. This "catch all" relieves the system engineer from the burden of having to explicitly define a table-entry for each state against every known possible event, in order to prevent the state-machine from hanging up when an unexpected stimulus has been received.

Implementation of the call-processing state-machine in this manner results in a number of key advantages.

1. Improved legibility of system logic. The system's intelligence is defined by the table directly, rather than by the translation into source code, as is the case of traditional approaches. In order for the system engineer to understand and/or change what the system does, he simply reads and modifies the table directly, rather than perusing source code. This allows telephone-system engineers with no understanding of source-code software language to accurately define, implement and test the prescribed call-processing operations.

2. Field modifiable operation. As noted previously, the state-table defines a complex, often lengthy sequence of states and actions to be taken as the system responds to external stimuli. The state-stable presupposes that the external stimuli will conform to some standard sequence, as laid down by international standards committees such as ITU. In practice, the interpretation of these standard sequences by system operators is often not consistent. It often is necessary to be able to change the call-processing flow to allow for unforeseen deviations from the expected sequence of stimuli. The systems engineer can do this, on site, by simply modifying the ASCII file with a standard text editor for word processor, then restarting the system. The changes are, thus, effected immediately, without the need for on-site compilation of the system software.

3. Rapid feature deployment. This ability to easily modify call processing by systems-engineers without recourse to programmers or software compiler and linker-tools significantly streamlines the development process, allowing for rapid development of features and functions in time-frames not feasible using a traditional software approach.

The three tables of the call-processing actual state-machine tables used in the invention are as follows. The first state-table is the "mobile-to-mobile state/event table". The second state-table is the "mobile-to-trunk state/event table". The third state-table is the "trunk-to-mobile state table". Each entry is based on the above listed example. That is, there are three column-entries which define: the current state to which the pointer may be directed, the event associated therewith, and then the next state to which the call-processing software is to be directed, and, finally, on the line or lines under these three column-entries, the action or actions required to be performed are listed. The pointer for the call-processing state-machine is controlled by the call-processing object software listed and discussed above. Because of the arrangement of the state machine, an operator need only be trained to call up the state machine, but he does not have to know software language or encoding, since the state machine clearly expresses to him his options in plain language. Thus, for an operator to make changes and updates to the state table, as for example changing the service of a present subscriber or adding a new one, he need only call up the state table and make the changes required, which is a relative simple task.

```
To:         gullifor @ pwgi.com @ inet
cc:         (bcc: Dan Gulliford/Phoenix Wireless Group Inc)
From:       chris @ wormhole.pwgi.com (Chris Matthies) @ inet
Date:       06/10/96  10:28:24 AM
Subject:    state tables ----------
X-Sun-Data-Type: text
X-Sun-Data-Description: text
X-Sun-Data-Name: text
X-Sun-Charset: us-ascii
X-Sun-Content-Lines: 1

Good luck here is three attachments, one for each state table.
----------
X-Sun-Data-Type: default
X-Sun-Data-Description: default
X-Sun-Data-Name: WacsMobileMobileState.excel.tbl
X-Sun-Charset: us-ascii
X-Sun-Content-Lines: 255

This is the Mobile to Mobile State/Event Table for WACS I.  Version number: 1.36 start state            event                       next state
       action(s)
#      ----------            -----                        ----------
----------
# Counter31 is number of call attempts
#-----------------------------------------------------
#      Call Setup...
#-----------------------------------------------------
       idle                  ORIGINATE                   validating
       (Counter:30 Validate)

# -- Authorization Phase...
       validating            VALID_MOBILE                LookUpCallingCk
       (SendAccept BeginBilling LookUpCircuit)
       validating            INVALID_MOBILE              idle
       (SendDeny Counter:31 CallCleanUp)

# -- Circuit Validation...
       LookUpCallingCk       LOOKUP_CIRCUIT_SUCCESS      waitOutSiezeStatus
       (ExLocalSeize)
       LookUpCallingCk       LOOKUP_CIRCUIT_FAIL         waitRelResNoTermMb
       (SendRelReq:1 Teardown Counter:43)
```

```
# -- Switch Connection...
    waitOutSiezeStatus    OUT_SEIZE_SUCCESS           lookingUpLib
(LookUpLib:1)
    lookingUpLib          LOOKUP_LIB_SUCCESS              checkingMobile
(CheckMobileBusy:1)
    lookingUpLib          LOOKUP_LIB_FAIL         waitDivert2Busy
(ExConnectReOrderPattern)
    checkingMobile        MOBILE_IDLE                     waitDivert2RingBack
(ExConnectRingBackPattern)
    checkingMobile        MOBILE_BUSY                     waitDivert2Busy
        (ExConnectBusyPattern Counter:33)
    waitDivert2RingBack CONNECT_TONE_SUCCESS   paging
(PageRequest Counter:32)

# -- Paging Mobile...
    paging                PAGE_RESP_SUCCESS           waitConverse
(Counter:34)

# -- Diverting Call But Receive Converse
    waitConverse          CONVERSE_SUCCESS        waitToneDisconnect
(ExDisConnectTonePattern)
    waitToneDisconnect    DISCONNECT_TONE_SUCCESS waitConnectStatus    (ExConnect)

# -- Connect the Call together...
    waitConnectStatus     CONNECT_SUCCESS                 speech
(Speech Counter:35)

#******************************************
#       RELEASE CASES-------
#******************************************
# ---------------------------------------------------------------
#       Mobile Release...Normal Originating Mobile
# ---------------------------------------------------------------
    speech                MOBILE_ORIG_RELEASE         owaitRel2ChnlStatus
(Teardown ExReleaseChannel)

# ---------------------------------------------------------------
#       Mobile Release...Normal Originating Mobile
# ---------------------------------------------------------------
    speech                MOBILE_TERM_RELEASE         twaitRel2ChnlStatus
(Teardown ExReleaseChannel)

# ---------------------------------------------------------------
#       Mobile Release...Authorization
# ---------------------------------------------------------------
```

```
        validating         MOBILE_ORIG_RELEASE       idle
(SendRelConf:1 Counter:36 EndBilling CallCleanUp)

#----------------------------------------------------------------
#     Mobile Release...Validation
#----------------------------------------------------------------
        LookUpCallingOk    MOBILE_ORIG_RELEASE       idle
(SendRelConf:1 Counter:36 EndBilling CallCleanUp)

#----------------------------------------------------------------
#     Mobile Release...Once mobile has been denied
#----------------------------------------------------------------
        denying            MOBILE_ORIG_RELEASE       idle
(SendRelConf:1 Counter:36 EndBilling CallCleanUp)

#----------------------------------------------------------------
#     Mobile Release...While checking if called mobile busy
#----------------------------------------------------------------
        checkingMobile     MOBILE_ORIG_RELEASE
waitRel1ChnlStatNoTermMb (Teardown ExReleaseChannel)

#----------------------------------------------------------------
#     Mobile Release...While waiting Divert to RingBack
#----------------------------------------------------------------
        waitDivert2RingBack MOBILE_ORIG_RELEASE      waitRel1ChnlStatNoTermMb
(Teardown ExReleaseChannel)

#----------------------------------------------------------------
#     Mobile Release...While waiting Divert to RingBack
#----------------------------------------------------------------
        waitDivert2Busy    CONNECT_TONE_SUCCESS      waitMbRelToneSrc
(NoOp)
        waitDivert2Busy    MOBILE_ORIG_RELEASE
waitRel1ChnlStatNoTermMb (Teardown ExReleaseChannel)
        waitMbRelToneSrc   MOBILE_ORIG_RELEASE       waitRel1ChnlStatNoTermMb
(Teardown ExReleaseChannel)

#----------------------------------------------------------------
#     Terminating Mobile Converse Fail...Waiting Converse
#----------------------------------------------------------------
        waitConverse       MOBILE_TERM_RELEASE       waitRelResTermMb
(Teardown SendRelReq:1)

#----------------------------------------------------------------
#     Mobile Release...paging
#----------------------------------------------------------------
```

```
        paging              MOBILE_ORIG_RELEASE      waitPgRespChnlRel
        (Teardown)
        waitPgRespChnlRel   PAGE_RESP_SUCCESS        waitRelMbChnlRel
(SendRelReq:2)
        waitPgRespChnlRel   PAGE_FAIL_NOTFOUND       waitRel1ChnlStatNoTermMb
(ExReleaseChannel)
        waitPgRespChnlRel   PAGE_FAIL_CKTBUSY        waitRel1ChnlStatNoTermMb
(ExReleaseChannel)

#----------------------------------------------------------------------
#       Orig Mobile Release...Waiting Converse
#----------------------------------------------------------------------
        waitConverse        MOBILE_ORIG_RELEASE      waitRelMbChnlRel
(Teardown SendRelReq:2)
        waitRelMbChnlRel    RELEASE_RESPONSE         waitRel1ChnlStatNoTermMb
(ExReleaseChannel)

#----------------------------------------------------------------------
#       Orig Mobile Release...Waiting Out Seize Result
#----------------------------------------------------------------------
        waitOutSiezeStatus  MOBILE_ORIG_RELEASE      waitOutSiezeNoCnct
(Teardown)
        waitOutSiezeNoCnct  OUT_SEIZE_SUCCESS        owaitRel1ChnlStatus
(ExReleaseChannel)
        waitOutSiezeNoCnct  OUT_SEIZE_FAIL           idle
(SendRelConf:1 EndBilling CallCleanUp)

#----------------------------------------------------------------------
#       Orig Mobile Release...Waiting Connection Status
#----------------------------------------------------------------------
        waitConnectStatus   MOBILE_ORIG_RELEASE      owaitCnctMbRel
(Teardown)
        owaitCnctMbRel      CONNECT_SUCCESS          owaitRel2ChnlStatus
(ExReleaseChannel)
        owaitCnctMbRel      CONNECT_FAIL             owaitRel1ChnlStatus
(ExReleaseChannel)

#----------------------------------------------------------------------
#       Term Mobile Release...Waiting Connection Status
#----------------------------------------------------------------------
        waitConnectStatus   MOBILE_TERM_RELEASE      twaitCnctMbRel
(Teardown)
        twaitCnctMbRel      CONNECT_SUCCESS          twaitRel2ChnlStatus
(ExReleaseChannel)
        twaitCnctMbRel      CONNECT_FAIL             twaitRel1ChnlStatus
(ExReleaseChannel)
```

```
#----------------------------------------------------------
#     Mobile Release...RACE Condition releasing mobile but mobile already released
#----------------------------------------------------------
        oreleasingMobile    MOBILE_TERM_RELEASE         idle
(SendRelConf:1 EndBilling CallCleanUp)
        treleasingMobile    MOBILE_ORIG_RELEASE         idle
(SendRelConf:2 EndBilling CallCleanUp)

#----------------------------------------------------------
#     Mobile Release...While disconnecting the tone
#----------------------------------------------------------
        waitToneDisconnect  MOBILE_ORIG_RELEASE         waitRelMbChnlRel
(Teardown SendRelReq:2)
        waitToneDisconnect  MOBILE_TERM_RELEASE         waitRelResTermMb
(Teardown SendRelReq:1)

#**********************************************************
#     FAILURE CASES-------
#**********************************************************
#----------------------------------------------------------
#     Mobile Authorization Fail...
#----------------------------------------------------------
        denying             ORIGINATE_FAIL              idle
            (EndBilling CallCleanUp)

#----------------------------------------------------------
#     Mobile Originate Fail during Authorization...
#----------------------------------------------------------
        validating          ORIGINATE_FAIL              Idle
        (EndBilling Counter:37 CallCleanUp)

#----------------------------------------------------------
#     Terminating Mobile Converse Fail...Waiting Converse
#----------------------------------------------------------
        waitConverse        CONVERSE_FAIL               waitRelResTermMb
(Teardown SendRelReq:1)

#----------------------------------------------------------
#     Divert to RingBack Fail
#----------------------------------------------------------
        waitDivert2RingBack CONNECT_TONE_FAIL waitRelResNoTermMbChnl
(Teardown SendRelReq:1)

#----------------------------------------------------------
#     Divert to Busy Fail
```

```
#---------------------------------------------------------
        waitDivert2Busy              CONNECT_TONE_FAIL  waitRelResNoTermMbChnl
(Teardown SendRelReq:1)

#---------------------------------------------------------
#       Switch Fail during Out Seize of Trunk...
#---------------------------------------------------------
        waitOutSiezeStatus    OUT_SEIZE_FAIL     waitRelResNoTermMb
(Teardown SendRelReq:1)

#---------------------------------------------------------
#       Switch Fail during Connect...
#---------------------------------------------------------
        waitConnectStatus       CONNECT_FAIL
waitRelChnlStatCnctFail     (Teardown ExReleaseChannel)
        waitRelChnlStatCnctFail RELEASE_CHANNEL_SUCCESS waitChnlRelCnctFail     (NoOp)
        waitChnlRelCnctFail   CHANNEL_RELEASED               waitMbRelBoth
            (SendRelReq:1 SendRelReq:2)
        waitMbRelBoth             RELEASE_RESPONSE         waitMbRelResFinal
            (NoOp)
        waitMbRelResFinal       RELEASE_RESPONSE        idle
            (EndBilling CallCleanUp)

waitRelChnlStatCnctFail RELEASE_CHANNEL_FAIL  waitMbRelBoth
        (SendRelReq:1 SendRelReq:2)

#*********************************************************
#       Page Fail Cases...
#*********************************************************
        paging                  PAGE_FAIL_NOTFOUND
waitToneDisconnectPgFail  (Counter:38 ExDisConnectTonePattern)
        paging                  PAGE_FAIL_CKTBUSY
waitToneDisconnectPgFail  (Counter:39 ExDisConnectTonePattern)
        waitToneDisconnectPgFail DISCONNECT_TONE_SUCCESS waitRecAnnCnctStatus
(ExRecAnnounceConnect)
        waitRecAnnCnctStatus REC_ANCE_CNCT_SUCCESS   waitRecAnnStatus
(NoOp)
        waitRecAnnStatus        REC_ANCE_COMPLETE
waitRelChnlStatNoTermMb  (Teardown ExReleaseChannel)
        waitToneDisconnectPgFail MOBILE_ORIG_RELEASE    waitRel1ChnlStatNoTermMb
(Teardown ExReleaseChannel)
        waitRecAnnCnctStatus MOBILE_ORIG_RELEASE       waitRel1ChnlStatNoTermMb
(Teardown ExReleaseChannel)
        waitRecAnnStatus        MOBILE_ORIG_RELEASE     waitRel1ChnlStatNoTermMb
(Teardown ExReleaseChannel)
        waitRelChnlStatNoTermMb  RELEASE_CHANNEL_SUCCESS waitRelChnlNoTermMb
```

```
            (NoOp)
        waitRelChnlNoTermMb      CHANNEL_RELEASED
waitRelResNoTermMb               (SendRelReq:1)

waitRecAnnCnctStatus  REC_ANCE_CNCT_FAIL      waitRelChnlStatNoTermMb
(Teardown ExReleaseChannel)
        waitRelChnlStatNoTermMb  RELEASE_CHANNEL_FAIL  waitRelResNoTermMb
            (SendRelReq:1)

# ***************************************************
#       CLEANUP CONVERGENCE------
# ***************************************************
# -----------------------------------------------------
#       ******** Orig Mobile Release Cleanup Final Phase...
# -----------------------------------------------------
        owaitRel2ChnlStatus   RELEASE_CHANNEL_SUCCESS   owaitChnlRel
        (NoOp)
        owaitChnlRel          CHANNEL_RELEASED          owaitChnlRelCmplt
(NoOp)
        owaitChnlRelCmplt     CHANNEL_RELEASED          oreleasingMobile
        (SendRelReq:2 Counter:36)
        owaitRel2ChnlStatus   RELEASE_CHANNEL_FAIL      oreleasingMobile
(SendRelReq:2 Counter:36)

# -----------------------------------------------------
#       ******** Term Mobile Release Cleanup Final Phase...
# -----------------------------------------------------
        twaitRel2ChnlStatus   RELEASE_CHANNEL_SUCCESS   twaitChnlRel
        (NoOp)
        twaitChnlRel          CHANNEL_RELEASED          twaitChnlRelCmplt
(NoOp)
        twaitChnlRelCmplt     CHANNEL_RELEASED          treleasingMobile
        (SendRelReq:1 Counter:36)
        twaitRel2ChnlStatus   RELEASE_CHANNEL_FAIL      treleasingMobile
(SendRelReq:1 Counter:36)

# -----------------------------------------------------
#       ******** Mobile Release Cleanup Final Phase...
# -----------------------------------------------------
        oreleasingMobile      RELEASE_RESPONSE          idle
        (SendRelConf:1 EndBilling CallCleanUp)
        treleasingMobile      RELEASE_RESPONSE          idle
        (SendRelConf:2 EndBilling CallCleanUp)

# -----------------------------------------------------
#       ******** Orig Mobile Release Out Seize Complete...
```

```
        waitRel1ChnlStatNoTermMb RELEASE_CHANNEL_SUCCESS waitChnlRelCmpltNoTermMb
(NoOp)
        waitChnlRelCmpltNoTermMb CHANNEL_RELEASED           idle
            (SendRelConf:1 EndBilling CallCleanUp)
        waitRel1ChnlStatNoTermMb RELEASE_CHANNEL_FAIL       idle
            (SendRelConf:1 EndBilling CallCleanUp)

#------------------------------------------------------------------------
#        ********* Orig Mobile Error Release Channel...
#------------------------------------------------------------------------
        owaitRel1ChnlStatNoTermMb RELEASE_CHANNEL_SUCCESS
owaitChnlRelCmpltNoTermMb       (NoOp)
        owaitChnlRelCmpltNoTermMb CHANNEL_RELEASED          idle
            (EndBilling CallCleanUp)
        owaitRel1ChnlStatNoTermMb RELEASE_CHANNEL_FAIL      idle
            (EndBilling CallCleanUp)

#------------------------------------------------------------------------
#        ********* Term Mobile Converse Fail Complete...
#------------------------------------------------------------------------
        twaitRel1ChnlStatNoTermMb RELEASE_CHANNEL_SUCCESS
twaitChnlRelCmpltNoTermMb       (NoOp)
        twaitChnlRelCmpltNoTermMb CHANNEL_RELEASED          idle
            (SendRelConf:2 EndBilling CallCleanUp)
        twaitRel1ChnlStatNoTermMb RELEASE_CHANNEL_FAIL      idle
            (SendRelConf:2 EndBilling CallCleanUp)

#------------------------------------------------------------------------
#        ********* Switch Release Cleanup Not Connected Final Phase...
#------------------------------------------------------------------------
        owaitRel1ChnlStatus   RELEASE_CHANNEL_SUCCESS       owaitChnlRelCmplt
(NoOp)
        twaitRel1ChnlStatus   RELEASE_CHANNEL_SUCCESS       twaitChnlRelCmplt
(NoOp)

owaitRel1ChnlStatus   RELEASE_CHANNEL_FAIL          idle
(SendRelConf:1 EndBilling CallCleanUp)
        twaitRel1ChnlStatus   RELEASE_CHANNEL_FAIL          idle
(SendRelConf:1 EndBilling CallCleanUp)

#------------------------------------------------------------------------
#        ********* Mobile Release Request No Terminating Mobile Final Phase...
#------------------------------------------------------------------------
        waitRelResTermMb              RELEASE_RESPONSE
twaitRel1ChnlStatNoTermMb (ExReleaseChannel)
```

```
            waitRelResNoTermMbChnl      RELEASE_RESPONSE
owaitRel1ChnlStatNoTermMb (ExReleaseChannel)
            waitRelResNoTermMb          RELEASE_RESPONSE       idle
            (EndBilling CallCleanUp)
- - - - - - - - - -
X-Sun-Data-Type: default
X-Sun-Data-Description: default
X-Sun-Data-Name: WacsMobileTrkState.excel.tbl
X-Sun-Charset: us-ascii
X-Sun-Content-Lines: 155

This is the Mobile to Trunk State/Event Table for WACS I.  Version number: 1.36 start state           event                        next state
action(s)
#       - - - - - - - - -     - - - - -                    - - - - - - - - -
- - - - - - - - -
# Counter16 is number of call attempts
#- - - - - - - - - - - - - - - - - - - - - - - - - - - - - - - - - - - - - -
#       Call Setup...
#- - - - - - - - - - - - - - - - - - - - - - - - - - - - - - - - - - - - - -
            idle                  ORIGINATE                     validating
            (Counter:15 Validate)

# -- Authorization Phase...
            validating            VALID_MOBILE                  LookUpCallingCk
            (SendAccept BeginBilling LookUpCircuit)
            validating            INVALID_MOBILE                Idle
            (SendDeny Counter:16 CallCleanUp)

# -- Circuit Validation...
            LookUpCallingCk       LOOKUP_CIRCUIT_SUCCESS  waitLocalSeizeStatus
(ExLocalSeize)
            LookUpCallingCk       LOOKUP_CIRCUIT_FAIL           releasingMobile
            (SendRelReq:1 Counter:28)

# -- Switch Connection...
            waitLocalSeizeStatus  OUT_SEIZE_SUCCESS  waitOutSiezeStatus  (ExOutSeize)
            waitLocalSeizeStatus  OUT_SEIZE_FAIL           releasingMobile
(SendRelReq:1 Counter:28)

waitOutSiezeStatus    OUT_SEIZE_SUCCESS       waitCallProcEvent  (NoOp)
            waitCallProcEvent     SUBSCRIBER_FREE             waitConnectStatus
(ExConnect Counter:18)
            waitConnectStatus     CONNECT_SUCCESS             waitAnswer
(Counter:24)
```

```
        waitAnswer              ANSWERED                  speech
(Speech)

#..........................................................
#       RELEASE CASES-------
#..........................................................
#-----------------------------------------------------------
#       Mobile Release...Normal
#-----------------------------------------------------------
        speech                  MOBILE_ORIG_RELEASE       waitRel2ChnlStatus
(Teardown ExReleaseChannel)
        waitAnswer              MOBILE_ORIG_RELEASE       waitRel2ChnlStatus
(Teardown ExReleaseChannel)

#-----------------------------------------------------------
#       Mobile Release...Authorization
#-----------------------------------------------------------
        validating              MOBILE_ORIG_RELEASE       idle
(SendRelConf:1 Counter:23 EndBilling CallCleanUp)

#-----------------------------------------------------------
#       Mobile Release...Validation
#-----------------------------------------------------------
        LookUpCallingCk         MOBILE_ORIG_RELEASE       idle
(SendRelConf:1 Counter:23 EndBilling CallCleanUp)

#-----------------------------------------------------------
#       Mobile Release...Once mobile has been denied
#-----------------------------------------------------------
        denying                 MOBILE_ORIG_RELEASE       idle
        (SendRelConf:1 Counter:23 EndBilling CallCleanUp)

#-----------------------------------------------------------
#       Mobile Release...Waiting Out Seize Result
#-----------------------------------------------------------
        waitLocalSeizeStatus MOBILE_ORIG_RELEASE    waitOutSiezeNoCnct  (Teardown)
        waitOutSiezeStatus   MOBILE_ORIG_RELEASE    waitOutSiezeNoCnct
(Teardown)
        waitOutSiezeNoCnct   OUT_SEIZE_SUCCESS      waitRel1ChnlStatus
(ExReleaseChannel)
        waitOutSiezeNoCnct   OUT_SEIZE_FAIL         idle
(SendRelConf:1 EndBilling CallCleanUp)

#-----------------------------------------------------------
#       Mobile Release...Waiting Connection Status
#-----------------------------------------------------------
```

```
           waitConnectStatus   MOBILE_ORIG_RELEASE      waitCnctMbRel
(Teardown)
           waitCnctMbRel       CONNECT_SUCCESS          waitRel2ChnlStatus
(ExReleaseChannel)
           waitCnctMbRel       CONNECT_FAIL             waitRel1ChnlStatus
(ExReleaseChannel)

# ---------------------------------------------------------------------
#     Mobile Release...RACE Condition releasing mobile but mobile already released
# ---------------------------------------------------------------------
           releasingMobile     MOBILE_ORIG_RELEASE      idle
           (EndBilling CallCleanUp)

# ---------------------------------------------------------------------
#     Trunk Release...Normal
# ---------------------------------------------------------------------
           speech              CHANNEL_RELEASED         waitChnlRelCmpltMb
(Teardown)
           waitChnlRelCmpltMb  MOBILE_ORIG_RELEASE      waitChnlRelCmplt   (NoOp)
           waitChnlRelCmpltMb  CHANNEL_RELEASED         releasingMobile
(SendRelReq:1)

# * * * * * * * * * * * * * * * * * * * * * * * * * * * * * * * * * * *
#     FAILURE  CASES-------
# * * * * * * * * * * * * * * * * * * * * * * * * * * * * * * * * * * *
# ---------------------------------------------------------------------
#     Mobile Authorization Fail...
# ---------------------------------------------------------------------
           denying             ORIGINATE_FAIL           idle
               (EndBilling CallCleanUp)

# ---------------------------------------------------------------------
#     Mobile Originate Fail during Authorization...
# ---------------------------------------------------------------------
           validating          ORIGINATE_FAIL           idle
               (EndBilling Counter:17 CallCleanUp)

# ---------------------------------------------------------------------
#     Switch Fail during Connect...
# ---------------------------------------------------------------------
           waitOutSiezeStatus  OUT_SEIZE_FAIL           releasingMobile
(Teardown SendRelReq:1)

# ---------------------------------------------------------------------
#     Switch Fail during Connect...
# ---------------------------------------------------------------------
```

```
            waitConnectStatus    CONNECT_FAIL
waitRelChnlStatCnctFail       (Teardown ExReleaseChannel)
       waitRelChnlStatCnctFail  RELEASE_CHANNEL_SUCCESS  waitChnlRelCnctFail  (NoOp)
       waitChnlRelCnctFail   CHANNEL_RELEASED               releasingMobile
       (SendRelReq:1)

# -------------------------------------------------------------------------
#       Switch Generate Busy Event
# -------------------------------------------------------------------------
            waitCallProcEvent   SUBSCRIBER_BUSY              waitDivert2Busy
       (ExConnectBusyPattern)
            waitDivert2Busy     CHANNEL_RELEASED             idle
       (EndBilling CallCleanUp)
            waitDivert2Busy     CONNECT_TONE_SUCCESS         waitMbRelToneSrc
(NoOp)
            waitDivert2Busy     CONNECT_TONE_FAIL            idle
       (EndBilling CallCleanUp)
            waitCallProcEvent   MOBILE_ORIG_RELEASE          waitRel2ChnlStatus
(Teardown ExReleaseSepChannel)
            waitMbRelToneSrc    MOBILE_ORIG_RELEASE          waitRel2ChnlStatus
(Teardown ExReleaseSepChannel)
            waitDivert2Busy     MOBILE_ORIG_RELEASE
waitRel2ChnlStatus (Teardown ExReleaseSepChannel)

# -------------------------------------------------------------------------
#       Switch Generate Network Congestion Event
# -------------------------------------------------------------------------
            waitCallProcEvent   NETWORK_CONGESTION           waitDivert2Reorder
(ExConnectReOrderPattern)
            waitDivert2Reorder  CHANNEL_RELEASED             idle
(CallCleanUp)
            waitDivert2Reorder  CONNECT_TONE_SUCCESS         waitMbRelToneSrc   (NoOp)
            waitDivert2Reorder  CONNECT_TONE_FAIL            idle
(EndBilling CallCleanUp)
            waitDivert2Reorder  MOBILE_ORIG_RELEASE          waitRel2ChnlStatus
(Teardown ExReleaseSepChannel)

# ***********************************************
#       CLEANUP CONVERGENCE-------
# ***********************************************
# -------------------------------------------------------------------------
#       ******** Trunk Side Mobile Release Cleanup Final Phase...
# -------------------------------------------------------------------------
            waitRel2ChnlStatus   RELEASE_CHANNEL_SUCCESS     waitChnlRel
                    (NoOp)
            waitChnlRel          CHANNEL_RELEASED
```

```
    waitChnlRelCmplt          (NoOp)
        waitChnlRelCmplt          CHANNEL_RELEASED              idle
            (SendRelConf:1 Counter:23 EndBilling CallCleanUp)
        waitRel2ChnlStatus        CHANNEL_RELEASED              idle
            (SendRelConf:1 Counter:23 EndBilling CallCleanUp)
        waitRel2ChnlStatus        RELEASE_CHANNEL_FAIL          idle
            (SendRelConf:1 Counter:23 EndBilling CallCleanUp)
        waitChnlRel               RELEASE_CHANNEL_FAIL          idle
            (SendRelConf:1 Counter:23 EndBilling CallCleanUp)
        waitChnlRelCmplt          RELEASE_CHANNEL_FAIL          idle
            (SendRelConf:1 Counter:23 EndBilling CallCleanUp)

# -----------------------------------------------------------------
#    ********* Mobile Release Cleanup Final Phase...
# -----------------------------------------------------------------
        releasingMobile           CHANNEL_RELEASED
releasingMobile          (NoOp)
        releasingMobile           RELEASE_RESPONSE              idle
            (EndBilling CallCleanUp)

# -----------------------------------------------------------------
#    ********* Switch Release Cleanup Not Connected Final Phase...
# -----------------------------------------------------------------
        waitRel1ChnlStatus        RELEASE_CHANNEL_SUCCESS
waitChnlRelCmplt    (NoOp)
        waitRel1ChnlStatus        RELEASE_CHANNEL_FAIL          idle
        (EndBilling CallCleanUp)

# -----------------------------------------------------------------
#    ********* Orig Mobile Release Out Seize Complete...
# -----------------------------------------------------------------
        waitRel1ChnlStatNoTermMb RELEASE_CHANNEL_SUCCESS waitChnlRelCmpltNoTermMb
(NoOp)
        waitChnlRelCmpltNoTermMb CHANNEL_RELEASED              idle
            (SendRelConf:1 EndBilling CallCleanUp)
        waitRel1ChnlStatNoTermMb RELEASE_CHANNEL_FAIL          idle
            (SendRelConf:1 EndBilling CallCleanUp)
- - - - - - - - - -
X-Sun-Data-Type: default
X-Sun-Data-Description: default
X-Sun-Data-Name: WacsState.excel.tbl
X-Sun-Charset: us-ascii
X-Sun-Content-Lines: 228

# This is the Trunk to Mobile State Table for WACS I. Version number: 1.27
# Counter1 is number of Trunk to Mobile call attempts
```

```
#     start state              event                      next state
                action(s)
#     -----------              -----                      ----------
#------------------------------------------------------------------------
#     Call Setup...
#------------------------------------------------------------------------
      idle                     INCOMING_CALL              lookingUpLib
              (Counter:0 LookUpLib)

# -- Authorization Phase...
      lookingUpLib             LOOKUP_LIB_SUCCESS         checkingMobile
              (CheckMobileBusy)

# -- Mobile Status Check...
      checkingMobile           MOBILE_BUSY
waitDivert2Busy                (ExConnectBusyPattern Counter:6)
      checkingMobile           MOBILE_IDLE
waitCallProcEventStatus        (ExGenCallProcEvent:34)
      waitCallProcEventStatus  GEN_CALLPROC_EV_SUCCESS    waitDivert2RingBack
              (ExConnectRingBackPattern)
      waitDivert2RingBack      CONNECT_TONE_SUCCESS       paging
              (PageRequest Counter:8)

# -- Paging Mobile...
      paging                   PAGE_RESP_SUCCESS          waitConverse
              (BeginBilling)

# -- Diverting Call But Receive Converse
      waitConverse             CONVERSE_SUCCESS           waitToneDisconnect
(ExDisConnectTonePattern)
      waitToneDisconnect       DISCONNECT_TONE_SUCCESS    waitConnectStatus
(ExConnect)

# -- Connect the Call together...
      waitConnectStatus        CONNECT_SUCCESS            speech
              (Speech Counter:9)

#*******************************************************************
#     RELEASE CASES-------
#*******************************************************************
#------------------------------------------------------------------------
#     Mobile Release...Normal
#------------------------------------------------------------------------
      speech                   MOBILE_TERM_RELEASE
```

```
waitRel2ChnlStatus          (Teardown ExReleaseChannel)

#----------------------------------------------------------------
#     Mobile Release...While Waiting for Connect
#----------------------------------------------------------------
        waitConnectStatus         MOBILE_TERM_RELEASE          waitCnctMbRel
              (Teardown)
        waitCnctMbRel                     CONNECT_SUCCESS
waitRel2ChnlStatus        (ExReleaseChannel)
        waitCnctMbRel                     CONNECT_FAIL
waitRel1ChnlStatus        (ExReleaseChannel)

#----------------------------------------------------------------
#     Mobile Release...While Waiting Tone Disconnect
#----------------------------------------------------------------
        waitToneDisconnect         MOBILE_TERM_RELEASE
waitToneDisconnectMbRel (Teardown)
        waitToneDisconnectMbRel    DISCONNECT_TONE_SUCCESS  waitRel1ChnlStatus
(ExReleaseChannel)
        waitToneDisconnectMbRel    DISCONNECT_TONE_FAIL     waitRel1ChnlStatus
(ExReleaseChannel)

#----------------------------------------------------------------
#     Mobile Release...While Releasing
#----------------------------------------------------------------
        releasingMobile            MOBILE_TERM_RELEASE           idle
              (EndBilling CallCleanUp)

#----------------------------------------------------------------
#     Fail...
#----------------------------------------------------------------
        waitConverse               MOBILE_TERM_RELEASE           waitChnlRelNoMobile
(Teardown ExReleaseChannel)

#----------------------------------------------------------------
#     Trunk Release...Normal
#----------------------------------------------------------------
        speech                     CHANNEL_RELEASED              waitChnlRelCmpltMb
(Teardown)
        waitChnlRelCmpltMb MOBILE_TERM_RELEASE          waitChnlRelCmplt    (NoOp)
        waitChnlRelCmpltMb CHANNEL_RELEASED             releasingMobile
(SendRelReq:2)

#----------------------------------------------------------------
#     Trunk Release...Checking the Trunk Library
#----------------------------------------------------------------
```

```
        lookingUpLib        CHANNEL_RELEASED            idle
(CallCleanUp)

#----------------------------------------------------------------------
#     Trunk Release...While Diverting Call Because of Busy Mobile
#----------------------------------------------------------------------
        waitDivert2Busy     CHANNEL_RELEASED            idle
        (CallCleanUp)

#----------------------------------------------------------------------
#     Trunk Release...While Paging Mobile
#----------------------------------------------------------------------
        paging              CHANNEL_RELEASED            waitPgRespChnlRel
(Teardown)
        waitPgRespChnlRel   PAGE_RESP_SUCCESS           releasingMobile
(SendRelReq:2)
        waitPgRespChnlRel   PAGE_FAIL_NOTFOUND          idle
        (Counter:4 CallCleanUp)
        waitPgRespChnlRel   PAGE_FAIL_CKTBUSY           idle
(Counter:10 CallCleanUp)

#----------------------------------------------------------------------
#     Trunk Release...While Paging Mobile
#----------------------------------------------------------------------
        waitConverse        CHANNEL_RELEASED            releasingMobile
(Teardown SendRelReq:2)

#----------------------------------------------------------------------
#     Trunk Release...While Waiting for Connection
#----------------------------------------------------------------------
        waitConnectStatus   CHANNEL_RELEASED            releasingMobile
(Teardown SendRelReq:2)

#----------------------------------------------------------------------
#     Trunk Release...RACE Condition Trunk and Mobile Release
#----------------------------------------------------------------------
        waitCnctMbRel       CHANNEL_RELEASED            idle
(SendRelConf:2 EndBilling CallCleanUp)

#----------------------------------------------------------------------
#     Trunk Release...RACE Condition Trunk and Mobile Release
#----------------------------------------------------------------------
        waitToneDisconnectMbRel  CHANNEL_RELEASED       idle
(SendRelConf:2 EndBilling CallCleanUp)

#----------------------------------------------------------------------
```

```
#     Trunk Release...Disconnecting Tone
# ----------------------------------------------------------------
        waitToneDisconnectPgFail    CHANNEL_RELEASED    idle        (CallCleanUp)

# ----------------------------------------------------------------
#     Trunk Release...Recorded Announce Connect
# ----------------------------------------------------------------
        waitRecAnnCnctStatus        CHANNEL_RELEASED    idle        (CallCleanUp)

# ----------------------------------------------------------------
#     Trunk Release...Recorded Connect Status
# ----------------------------------------------------------------
        waitRecAnnStatus            CHANNEL_RELEASED    idle
(CallCleanUp)

# ----------------------------------------------------------------
#     Trunk Release...Recorded Connect Status
# ----------------------------------------------------------------
        waitToneDisconnect          CHANNEL_RELEASED    releasingMobile
(Teardown SendRelReq:2)

# ****************************************************************
#     BUSY CASES-------
# ****************************************************************
# ----------------------------------------------------------------
#     Busy Mobile...
# ----------------------------------------------------------------
        waitDivert2Busy             CONNECT_TONE_SUCCESS
waitChnlRelNoMobileCmplt (NoOp)

# ****************************************************************
#     FAILURE CASES-------
# ****************************************************************

# ****************************************************************
#     Page Fail Cases...
# ****************************************************************
        paging                                          PAGE_FAIL_NOTFOUND
waitToneDisconnectPgFail (Counter:4 ExDisConnectTonePattern)
        paging                                          PAGE_FAIL_CKTBUSY
waitToneDisconnectPgFail (Counter:10 ExDisConnectTonePattern)
        waitToneDisconnectPgFail    DISCONNECT_TONE_SUCCESS waitRecAnnCnctStatus
(ExRecAnnounceConnect)
        waitRecAnnCnctStatus        REC_ANCE_CNCT_SUCCESS   waitRecAnnStatus
(NoOp)
        waitRecAnnStatus                                REC_ANCE_COMPLETE
```

```
waitChnlRelNoMobile        (Teardown ExReleaseChannel)
    waitToneDisconnectPgFail   CHANNEL_RELEASED      idle
        (CallCleanUp)
    waitRecAnnCnctStatus       CHANNEL_RELEASED      idle
        (CallCleanUp)
    waitRecAnnStatus                                  CHANNEL_RELEASED      idle
        (CallCleanUp)

#****************************************************
#    Divert to Busy Fail
#****************************************************
    waitDivert2Busy            CONNECT_TONE_FAIL     idle
        (CallCleanUp)

#----------------------------------------------------
#    Subscriber Lookup Fail...
#----------------------------------------------------
    lookingUpLib               LOOKUP_LIB_FAIL       waitDivert2Busy
        (Teardown Counter:1 ExConnectReOrderPattern)

#----------------------------------------------------
#    Fail...
#----------------------------------------------------
    waitConverse               CONVERSE_FAIL         waitChnlRelNoMobile
        (Teardown Counter:7 ExReleaseChannel)

#----------------------------------------------------
#    Fail...
#----------------------------------------------------
    waitCallProcEventStatus    GEN_CALLPROC_EV_FAIL  waitChnlRelNoMobile
(Teardown ExReleaseChannel)

#----------------------------------------------------
#    Divert to RingBack Fail
#----------------------------------------------------
    waitDivert2RingBack        CONNECT_TONE_FAIL     idle
        (Counter:13 CallCleanUp)

#----------------------------------------------------
#    Disconnect Tone Fail...
#----------------------------------------------------
    waitToneDisconnect         DISCONNECT_TONE_FAIL  waitRel1ChnlStatus
(Teardown ExReleaseChannel)

#----------------------------------------------------
```

```
#       Page Fail Disconnect Tone for Recorded Announce...
#----------------------------------------------------------
        waitToneDisconnectPgFail  DISCONNECT_TONE_FAIL    waitRel1ChnlStatus
            (Teardown ExReleaseChannel)

#----------------------------------------------------------
#       Page Fail Recorded Announce Connection Fail...
#----------------------------------------------------------
        waitRecAnnCnctStatus      REC_ANCE_CNCT_FAIL      waitRel1ChnlStatus
            (Teardown ExReleaseChannel)

#----------------------------------------------------------
#       Call Connection Failed...
#----------------------------------------------------------
        waitConnectStatus         CONNECT_FAIL
waitRel1ChnlStatus                (Teardown ExReleaseChannel)

#**********************************************************
#       CLEANUP CONVERGENCE------
#**********************************************************
#----------------------------------------------------------
#       ******** Trunk Side Mobile Release Cleanup Final Phase...
#----------------------------------------------------------
        waitRel2ChnlStatus        RELEASE_CHANNEL_SUCCESS  waitChnlRel
            (NoOp)
        waitChnlRel               CHANNEL_RELEASED
waitChnlRelCmplt  (NoOp)
        waitChnlRelCmplt          CHANNEL_RELEASED          idle
            (SendRelConf:2 EndBilling CallCleanUp)
        waitRel2ChnlStatus        CHANNEL_RELEASED          idle
            (SendRelConf:1 Counter:23 EndBilling CallCleanUp)
        waitRel2ChnlStatus        RELEASE_CHANNEL_FAIL      idle
            (SendRelConf:1 Counter:23 EndBilling CallCleanUp)
        waitChnlRel               RELEASE_CHANNEL_FAIL      idle
            (SendRelConf:1 Counter:23 EndBilling CallCleanUp)
        waitChnlRelCmplt          RELEASE_CHANNEL_FAIL      idle
            (SendRelConf:1 Counter:23 EndBilling CallCleanUp)

#----------------------------------------------------------
#       ********* Trunk Release No Mobile Cleanup Final Phase...
#----------------------------------------------------------
        waitChnlRelNoMobile       RELEASE_CHANNEL_SUCCESS
waitChnlRelNoMobileCmplt  (NoOp)
        waitChnlRelNoMobileCmplt  CHANNEL_RELEASED          idle
            (CallCleanUp)
        waitChnlRelNoMobile       RELEASE_CHANNEL_FAIL      idle
```

```
                    (CallCleanUp)

# - - - - - - - - - - - - - - - - - - - - - - - - - - - - - - - - - - - - - - -
#     ********* Mobile Release Cleanup Final Phase...
# - - - - - - - - - - - - - - - - - - - - - - - - - - - - - - - - - - - - - - -
        releasingMobile         RELEASE_RESPONSE            idle
            (EndBilling CallCleanUp)

# - - - -
- - - - - - - - - - - - - - - - - - - - - - - - - - - - - - - - - - - - - - - -
#     ********* Switch Release Cleanup Not Connected Final Phase...
# - - - - - - - - - - - - - - - - - - - - - - - - - - - - - - - - - - - - - - -
        waitRel1ChnlStatus      RELEASE_CHANNEL_SUCCESS
waitChnlRelCmplt  (NoOp)
        waitRel1ChnlStatus      RELEASE_CHANNEL_FAIL        idle
            (EndBilling CallCleanUp)
```

As discussed above, there are three object-components to the software applications of the adjunct node-processor 12. The call-processing objects software listing and the state machine therefor have been shown and described above. The second component, cell-site interface objects applications software, also includes a state table and object-software listing for creating a pointer. However, whereas in the call-processing objects, the state table therefor is separate and distinct from the objects, or pointer, in the cell-site interface objects applications software, the state table therefor is embedded in the actual objects-software listing itself. The following is the software listing of the cell-site interface objects application software with its embedded state table.

```
/************************************************************
 *******
 * $Source: /src/work/WACS/src/gsLib/RCS/smartradio.C,v $
 * $Date: 1996/06/12 18:38:10 $
 * Description: object encapsulation of Grayson's Smart Radio
 * Author: tsao@pwgi.com
 *
 ************************************************************
 *****/ include <share/bss2mccmsg.h> include <gsLib/smartradio.h>
include <gsLib/smartcell.h>
include <gsLib/gsevents.h> include <utlLib/fsm.h>
include <utlLib/action.h>
#include <utlLib/iocallback.h>
#include <utlLib/dispatcher.h>
include <utlLib/list.h> include <ttLib/ttipc.h> include <OTC/debug/tracer.hh>
include <OTC/debug/tracetag.hh>
OTCLIB_STATIC_TRACETAG(RADIO_TRACE);

declareIOCallback(SmartRadio)
implementIOCallback(SmartRadio)

declareActionCallback(SmartRadio)
implementActionCallback(SmartRadio)

static int _dnldTimerInt;
//static int _pktseqno;
//static int sendRetries;
static char* RdoStStr[] = {
        "RdoUnknown",
        "RdoDnldReq",
        "RdoDnlding",
        "RdoDnldOk",
        "RdoDnldFailed",
        "RdoConfiguring",
        "RdoIdle",
        "RdoOriginating",
        "RdoOnChannel",
        "RdoWaitTerm",
        "RdoPaging",
        "RdoPageResped",
        "RdoAlerting",
        "RdoAnswered",
        "RdoRelReq",
        "RdoSpeech",
```

```
        "RdoDown",
        "RdoMissing",
        "RdoDisabled",
        "RdoProblem"
    };

RdoImagePkt::RdoImagePkt(int len, const u_char* pkt)
{
  _len = len;
  _pktp = new u_char[len];
  memcpy(_pktp, pkt, len);
}

RdoImagePkt::~RdoImagePkt() { delete [] _pktp; }

RadioCfg::RadioCfg(
                    u_char type, u_char mode, u_char sat, u_char dcc,
                    u_char pwr, u_char aveprd, u_char diff, u_short chnl
                    )
  : _type(type), _mode(mode), _sat(sat), _dcc(dcc), _chnl(chnl), _pwr(pwr),
        _aveprd(aveprd), _diff(diff)
{}

RadioCfg::RadioCfg() {}

RadioCfg::RadioCfg(const RadioCfg& rc)
{
  _type = rc._type;
  _mode = rc._mode;
  _sat = rc._sat;
  _dcc = rc._dcc;
  _pwr = rc._pwr;
  _aveprd = rc._aveprd;
  _diff = rc._diff;
  _chnl = rc._chnl;
}

RadioCfg& RadioCfg::operator=(const RadioCfg& rc)
{
  _type = rc._type;
  _mode = rc._mode;
  _sat = rc._sat;
  _dcc = rc._dcc;
  _pwr = rc._pwr;
  _aveprd = rc._aveprd;
  _diff = rc._diff;
  _chnl = rc._chnl;
  return *this;
}

SmartRadio::SmartRadio(SmartCell* s, int n, const RadioCfg& rc)
{
  _smcell = s;
  _rid = n;
```

```
   _rdocfg = rc;
   _callid = 0;
   _calltype = 0;
   _isLoaded = 0;

init_timer();
   init_fsm();
} void SmartRadio::init_timer()
{
  //--- dnld timer
  _iohdnldTimer = new IOCallback(SmartRadio)(
                                                             this,
&SmartRadio::dnld_timer
                                                             );

//--- orig timer
  _iohorigTimer = new IOCallback(SmartRadio)(
                                                             this,
&SmartRadio::orig_timer
                                                             );
  //— page timer
  _iohpageTimer = new IOCallback(SmartRadio)(
                                                             this,
&SmartRadio::page_timer
                                                             );
  //--- tune2chan timer
  _ioht2cTimer = new IOCallback(SmartRadio)(
                                                             this,
         &SmartRadio::t2c_timer
                                                             );
  //--- alert timer
  _iohalertTimer = new IOCallback(SmartRadio)(
                                                             this,
&SmartRadio::alert_timer
                                                             );

//— term timer
  _iohtermTimer = new IOCallback(SmartRadio)(
                                                             this,
&SmartRadio::term_timer
                                                             );
  //--- term timer
  _iohcfgTimer = new IOCallback(SmartRadio)(
                                                             this,
&SmartRadio::cfg_timer
```

```
                                                                              );
  char* p = getenv("DNLD_TIMER");
  _dnldTimerInt = p ? atoi(p) : defaultDnldTimer;
}

SmartRadio::~SmartRadio()
{
  delete _iohdnldTimer;
  delete _iohorigTimer;
  delete _iohpageTimer;
  delete _ioht2cTimer;
  delete _iohalertTimer;
  delete _iohtermTimer;
  delete _fsm;
} void SmartRadio::init_fsm()
{
  OTCLIB_TRACER(RADIO_TRACE>2) << "Radio: " << _rid << endl;
  OTCLIB_TRACER(RADIO_TRACE>2) << " Initializing the radio......" << endl;
  OTCLIB_TRACER(RADIO_TRACE>2) << " Creating a State Machine......" << endl;
  _fsm = new FSM(RdoUnknown);
  OTCLIB_TRACER(RADIO_TRACE>2) << " Load the state table......" << endl;
  load_statetbl();
} int SmartRadio::get_state() const
{
  return _fsm->get_state();
} int SmartRadio::set_state(RadioState s)
{
  OTCLIB_TRACER(RADIO_TRACE>2) << "State Change, ";
  OTCLIB_TRACER(RADIO_TRACE>2) << "From: " << get_state() << " To: "
<<s<<endl;

if (s == RdoIdle){
        clear_radio();
        stop_all_timers();
  }

_smcell->msg2monet_radio_status(_rid, s);

return _fsm->go(s);
} void SmartRadio::clear_radio()
{
  OTCLIB_TRACER(RADIO_TRACE>2) << "SmartRadio::clear_radio()" << endl;
  _calltype = Unknown;
  _callid = 0;
  memset(_min, '\0', 17);
```

```cpp
}
//--- message handlers for messages from SmartCELL
void SmartRadio::cellmsg_handler(int e, const GrsnFrame& f, u_long cid)
{
  OTCLIB_TRACER(RADIO_TRACE>2) << " Radio: " << _rid << endl;
  OTCLIB_TRACER(RADIO_TRACE>2) << " SmartRadio::cellmsg_handler()" << endl;

if (cid > 0) _callid = cid;
  _frm = f;
  _fsm->fire(e);
  _smcell->msg2monet_radio_status(_rid, _fsm->get_state());

} void SmartRadio::mccmsg_handler(int e)
{
  OTCLIB_TRACER(RADIO_TRACE>2) << "Radio: " << _rid << endl;
  OTCLIB_TRACER(RADIO_TRACE>2) << "SmartRadio::mccmsg_handler()" << endl;
  _fsm->fire(e);
  _smcell->msg2monet_radio_status(_rid, _fsm->get_state());
} void SmartRadio::cellmsg_radiostat()
{
  OTCLIB_TRACER(RADIO_TRACE) << "Radio Stat, Radio No: " << _rid;

int s = _frm.get_statbits();
  OTCLIB_TRACER(RADIO_TRACE) << ", Status: " << hex << s << dec <<endl <<
endl;

int st = get_state();
  if (st == RdoDnlding || st == RdoDisabled ) return;

//u_char txpwr = _frm.get_txpwr();
  //cout << "*** Radio Stat Tx Pwr: " << hex << (int)txpwr << dec << endl << endl;
  //u_char antno = _frm.get_antno();
  //cout << "*** Radio Stat Ant Num: " << hex << (int)antno << dec << endl << endl;

switch (s) {
  case (int)RadioStateOk: {
          if (_rdocfg._type == RdTypeSetUp) _smcell->cfg_sysheader(_rid);
          if (st != RdoDnlding && !is_rdoincall()) set_state(RdoIdle);
          break;
  }
  case (int)RadioStateCfgReq:
          stop_wait_for_cfg();
          cfg_radio();
          set_state(RdoConfiguring);
          break;
  case (int)RadioStateDnldReq: {
          start_dnld_image();
          set_state(RdoDnlding);
          _smcell->msg2monet_radio_status(_rid, SmartRadio::RdoDnlding);
```

```
                    char buf[40];
                    ::sprintf(buf, "Start Download Radio: %d", _rid);
                    _smcell->msg2monet_text_status(buf);
                    ::sprintf(buf, "Radio: %d DownLoad", _rid);
                    _smcell->msg2alarm("RadioAlarm", buf);
                    break;
            }
            case RadioStateMissing: {
                    //if ( !is_rdoincall() ) set_state(RdoMissing);
                    char buf[40];
                    ::sprintf(buf, "Radio: %d Not Installed", _rid);
                    _smcell->msg2alarm("RadioAlarm", buf);
                    set_state(RdoMissing);
                    break;
            }
            case (int)RadioStateCntrlLock:
                    break;
            case (int)RadioStateTxStatus:
                    cout << "Radio Stat: Radio Transmitter ON Radio: " << _rid << endl;
                    break;
            default: {
                    char buf[40];
                    ::sprintf(buf, "Radio: %d Problem", _rid);
                    _smcell->msg2alarm("RadioAlarm", buf);
                    cerr << "Error in radio: " << _rid << endl;
                    set_state(RdoProblem);
                    break;
            }
    }

}

_smcell->check_rdo_status();

} void SmartRadio::cellmsg_lvlchg()
{
    OTCLIB_TRACER(RADIO_TRACE>2) << "Radio: " << _rid << endl;
    OTCLIB_TRACER(RADIO_TRACE>2) << "SmartRadio::cellmsg_lvlchg()" << endl;
    _rssi = _frm.get_rssi();
    _satind = _frm.get_satind();
    OTCLIB_TRACER(RADIO_TRACE>2) << "RSSI: " << (int)_rssi << endl;
    OTCLIB_TRACER(RADIO_TRACE>2) << "SAT Ind: " << (int)_satind << endl;
    cout << "level change rdo: " << _rid << " rssi: " << (int)_rssi << endl;
} void SmartRadio::cellmsg_measack()
{
    OTCLIB_TRACER(RADIO_TRACE>2) << "Radio: " << _rid << endl;
    OTCLIB_TRACER(RADIO_TRACE>2) << "SmartRadio::cellmsg_measack()" << endl;
    _rssi = _frm.get_rssi();
    _satind = _frm.get_satind();
    OTCLIB_TRACER(RADIO_TRACE>2) << "RSSI: " << (int)_rssi << endl;
    OTCLIB_TRACER(RADIO_TRACE>2) << "SAT Ind: " << (int)_satind << endl;
```

```
_smcell->msg2monet_measack_data(_rid, (int)_rssi, (int)_satind);
cout << "measure change rdo: " << _rid << " rssi: " << (int)_rssi << endl;

} void SmartRadio::cellmsg_orig()
{
OTCLIB_TRACER(RADIO_TRACE) << "Radio: " << _rid;
OTCLIB_TRACER(RADIO_TRACE) << ", SmartRadio::cellmsg_orig()" << endl;

_calltype = Mb2Trk;
_callid = _smcell->create_callid();

_frm.get_min(_min);
_frm.get_esn(_esn);
_frm.get_dgs(_dgs);
OTCLIB_TRACER(RADIO_TRACE) << "Call id: " << _callid;
OTCLIB_TRACER(RADIO_TRACE) << "MIN: " << _min;
OTCLIB_TRACER(RADIO_TRACE) << ", ESN: " << _esn;
OTCLIB_TRACER(RADIO_TRACE) << ", Digits: " << _dgs << endl << endl;

// tuning to the channel
_smcell->msg2bss_tune2chan(_min, _rid);
// for test only
_smcell->msg2bss_seize(_rid, _rid);
start_t2ctimer();
} void SmartRadio::cellmsg_onchan()
{
OTCLIB_TRACER(RADIO_TRACE) << "Radio: " << _rid;
OTCLIB_TRACER(RADIO_TRACE) << ",
SmartRadio::cellmsg_onchan()"<<endl<<endl;

stop_t2ctimer();
// send a call originate now
// for test only
_smcell->msg2mcc_orig(_callid, _rid, _min, _esn, _dgs);
start_origtimer();
} void SmartRadio::cellmsg_pgonchan()
{
OTCLIB_TRACER(RADIO_TRACE) << "Radio: " << _rid;
OTCLIB_TRACER(RADIO_TRACE) << ",
SmartRadio::cellmsg_pgonchan()"<<endl<<endl;

stop_t2ctimer();

// page responded
_smcell->msg2mcc_pageresp(_rid, _callid, Bss2MccPageSuccess, 0, _esn);

GrsnFrame tf;
```

```
  _smcell->msg2bss_alert(_rid);
  start_alerttimer();
} void SmartRadio::cellmsg_pageresp()
{
  OTCLIB_TRACER(RADIO_TRACE) << "Radio: " << _rid;
  OTCLIB_TRACER(RADIO_TRACE) << ", SmartRadio::cellmsg_pageresp()" << endl;

_calltype = Trk2Mb;
  _frm.get_min(_min);
  _frm.get_esn(_esn);

OTCLIB_TRACER(RADIO_TRACE) << "Call Id: " << _callid;
  OTCLIB_TRACER(RADIO_TRACE) << ", MIN: " << _min;
  OTCLIB_TRACER(RADIO_TRACE) << ", ESN: " << _esn << endl << endl;

// assign the voice channel
  _smcell->msg2bss_tune2chan(_min, _rid);
  _smcell->msg2bss_seize(_rid, _rid);
  start_t2ctimer();
} void SmartRadio::cellmsg_answer()
{
  OTCLIB_TRACER(RADIO_TRACE) << "Radio: " << _rid;
  OTCLIB_TRACER(RADIO_TRACE) << ", SmartRadio::cellmsg_answer()"<<endl<<endl;

stop_alerttimer();
  _smcell->msg2mcc_converse(_callid, ConnectSuccess);
} void SmartRadio::cellmsg_term(const GrsnFrame& f)
{
  OTCLIB_TRACER(RADIO_TRACE) << "Radio: " << _rid;
  OTCLIB_TRACER(RADIO_TRACE) << ", SmartRadio::cellmsg_term()" << endl;

_frm = f;
  int rsn = _frm.get_rsn();

OTCLIB_TRACER(RADIO_TRACE) << "Reason: " << rsn << endl <<endl;

_calltype = 0;
  int s = _fsm->get_state();
  if (s == RdoWaitTerm)
        cellmsg_release(rsn);
  else if (s == RdoOriginating)
        stop_t2ctimer();
  else if (s == RdoPageResped) {
        stop_t2ctimer();
        int rc;
        if (rsn == RcTermSatLost)
          rc = Bss2MccPageFailSATLost;
```

```
            else if (rsn == RcTermNoST || rsn == RcTermSTTimeout)
                rc = Bss2MccPageFailAlertFail;
            else
                rc = Bss2MccPageFailUnknown;

_smcell->msg2mcc_pageresp(_rid, _callid, Bss2MccPageFail, rc);
    }
    else if (s > RdoOriginating) {
            _smcell->msg2mcc_relind(_callid, rsn);
            start_termtimer();
            set_state(RdoWaitRelConf);
            return;
    }
    set_state(RdoIdle);
} void SmartRadio::cellmsg_release(int rsn)
{
    OTCLIB_TRACER(RADIO_TRACE) << "Radio: " << _rid;
    OTCLIB_TRACER(RADIO_TRACE) << ", SmartRadio::cellmsg_release()";
    OTCLIB_TRACER(RADIO_TRACE) << ", Reason: " << rsn << endl;

_smcell->msg2mcc_relconf(_callid, rsn);
}

//--- message handlers for messages from MCC
void SmartRadio::mccmsg_page()
{
    OTCLIB_TRACER(RADIO_TRACE) << "Radio: " << _rid;
    OTCLIB_TRACER(RADIO_TRACE) << ", SmartRadio::mccmsg_page()" << endl;
    u_long cid; char* min;
    TTIPC& tt = TTIPC::instance();
    tt.get_msg();
    tt >> cid >> min;

OTCLIB_TRACER(RADIO_TRACE) << "Call id: " << cid;
    OTCLIB_TRACER(RADIO_TRACE) << ", Min: " << min << endl << endl;

_callid = cid;
    ::strcpy(_min, min);
    _calltype = Trk2Mb;
    _smcell->msg2bss_page(min);
    start_pagetimer();
} void SmartRadio::mccmsg_relreq()
{
    OTCLIB_TRACER(RADIO_TRACE) << "Radio: " << _rid;
    OTCLIB_TRACER(RADIO_TRACE) << ", SmartRadio::mccmsg_relreq()" << endl;
    if (get_state() != RdoIdle) {
            _smcell->msg2bss_relreq(_rid);
            stop_alerttimer();
            start_termtimer();
            set_state(RdoWaitTerm);
```

```
    }
    else
        _smcell->msg2mcc_relconf(_callid);
}

//------ some timers
void SmartRadio::dnld_timer(long sec, long usec)
{
  OTCLIB_TRACER(RADIO_TRACE) << "Radio: " << _rid;
  OTCLIB_TRACER(RADIO_TRACE) << ", SmartRadio::dnld_timer()" << endl << endl;
  sec,usec;
  if (_sendRetries++ < MaxSendRetries) {
        _smcell->send_rdopkt(_rid, _pktseqno);
        start_dnldtimer(_dnldTimerInt);
  }
  else
        set_state(RdoDnldFailed);
} void SmartRadio::start_dnldtimer(long sec, long usec)
{
  OTCLIB_TRACER(RADIO_TRACE) << "Radio: " << _rid;
  OTCLIB_TRACER(RADIO_TRACE) << ", SmartRadio::start_dnldtimer()"
<<endl<<endl;

stop_dnldtimer();
  Dispatcher::instance().startTimer(
                                        sec,usec,
                                        _iohdnldTimer, Dispatcher::VolatileType
                                        );
}
void SmartRadio::stop_all_timers()
{
        OTCLIB_TRACER(RADIO_TRACE>2) << "Radio: " << _rid;
    OTCLIB_TRACER(RADIO_TRACE>2) << ", SmartRadio::stop_all_timers()" <<endl;
        stop_origtimer();
        stop_termtimer();
        stop_pagetimer();
        stop_t2ctimer();
        stop_alerttimer();
} void SmartRadio::stop_dnldtimer()
{
  OTCLIB_TRACER(RADIO_TRACE>2) << "Radio: " << _rid;
  OTCLIB_TRACER(RADIO_TRACE>2) << ", SmartRadio::stop_dnldtimer()" <<endl;

Dispatcher::instance().stopTimer(_iohdnldTimer);
} void SmartRadio::orig_timer(long sec, long usec)
{
```

```
    OTCLIB_TRACER(RADIO_TRACE>2) << "Radio: " << _rid;
    OTCLIB_TRACER(RADIO_TRACE>2) << ", SmartRadio::orig_timer()" << endl <<
endl;
    sec,usec;
    // tear down the call and send the release to both side
    _smcell->msg2mcc_relind(_callid);
    _smcell->msg2bss_relreq(_rid);

set_state(RdoIdle);
} void SmartRadio::start_origtimer(long sec, long usec)
{
    OTCLIB_TRACER(RADIO_TRACE>2) << "Radio: " << _rid;
    OTCLIB_TRACER(RADIO_TRACE>2) << ", SmartRadio::start_origtimer()" << endl;

Dispatcher::instance().startTimer(
                                                        sec, usec,
                                                        _iohorigTimer, Dispatcher::VolatileType
                                                        );
} void SmartRadio::stop_origtimer()
{
    OTCLIB_TRACER(RADIO_TRACE>2) << "Radio: " << _rid;
    OTCLIB_TRACER(RADIO_TRACE>2) << ", SmartRadio::stop_origtimer()" << endl;

Dispatcher::instance().stopTimer(_iohorigTimer);
} void SmartRadio::start_termtimer(long sec, long usec)
{
        stop_termtimer();
        Dispatcher::instance().startTimer(
                                                        sec, usec,
                                                        _iohtermTimer, Dispatcher::VolatileType
                                                        );
}
void SmartRadio::stop_termtimer()
{
    OTCLIB_TRACER(RADIO_TRACE>2) << "Radio: " << _rid;
    OTCLIB_TRACER(RADIO_TRACE>2) << ", SmartRadio::stop_termtimer()" << endl;

Dispatcher::instance().stopTimer(_iohtermTimer);
} void SmartRadio::term_timer(long sec, long usec)
{
    // assume radio idle, add some check later on
    sec, usec;
```

```
  set_state(RdoIdle);
} void SmartRadio::page_timer(long sec, long usec)
{
  OTCLIB_TRACER(RADIO_TRACE>2) << "Radio: " << _rid;
  OTCLIB_TRACER(RADIO_TRACE>2) << ", SmartRadio::page_timer()" << endl;
  sec, usec;
  set_state(RdoIdle);

// either retry or send page fail not found
  _smcell->msg2mcc_pageresp(_rid, _callid, Bss2MccPageFail,
Bss2MccPageFailNotFound);
} void SmartRadio::start_pagetimer(long sec, long usec)
{
  OTCLIB_TRACER(RADIO_TRACE>2) << "Radio: " << _rid;
  OTCLIB_TRACER(RADIO_TRACE>2) << ", SmartRadio::start_pagetimer()" << endl;
  sec, usec;
  Dispatcher::instance().startTimer(
                                     sec, usec,
                                     _iohpageTimer, Dispatcher::VolatileType
                                     );
} void SmartRadio::stop_pagetimer()
{
  OTCLIB_TRACER(RADIO_TRACE>2) << "Radio: " << _rid;
  OTCLIB_TRACER(RADIO_TRACE>2) << ", SmartRadio::stop_pagetimer()" <<endl;

Dispatcher::instance().stopTimer(_iohpageTimer);
}

//----- tune to channel timer
void SmartRadio::t2c_timer(long sec, long usec)
{
  OTCLIB_TRACER(RADIO_TRACE>2) << "Radio: " << _rid << endl;
  OTCLIB_TRACER(RADIO_TRACE>2) << "SmartRadio::t2c_timer()" <<endl<<endl;
  sec,usec;

// send page fail SAT
  int s = get_state();
  if (s == RdoPageResped)
        _smcell->msg2mcc_pageresp(_rid, _callid, Bss2MccPageFail,
Bss2MccPageFailSATLost);
   else if (s == RdoOriginating) {
        // retry here
        OTCLIB_TRACER(RADIO_TRACE)<<"Radio: "<<_rid <<" Originate Fail
!"<<endl;
  }
```

```
  set_state(RdoIdle);
}
void SmartRadio::start_t2ctimer(long sec, long usec)
{
  OTCLIB_TRACER(RADIO_TRACE>2) << "Radio: " << _rid;
  OTCLIB_TRACER(RADIO_TRACE>2) << "SmartRadio::start_t2ctimer()" <<endl<<
endl;
  Dispatcher::instance().startTimer(
                                                          sec, usec,
                                                          _ioht2cTimer, Dispatcher::VolatileType
                                                          );
}
void SmartRadio::stop_t2ctimer()
{
  OTCLIB_TRACER(RADIO_TRACE>2) << "Radio: " << _rid;
  OTCLIB_TRACER(RADIO_TRACE>2) << ", SmartRadio::stop_t2ctimer()" << endl;
  Dispatcher::instance().stopTimer(_ioht2cTimer);
}
//------ alert timer
void SmartRadio::alert_timer(long sec, long usec)
{
  OTCLIB_TRACER(RADIO_TRACE) << "Radio: " << _rid;
  OTCLIB_TRACER(RADIO_TRACE) << ", SmartRadio::alert_timer()" << endl;

sec, usec;
  set_state(RdoIdle);

// send alert fail no answer
  _smcell->msg2mcc_pageresp(_rid, _callid, Bss2MccPageFail,
Bss2MccPageFailNoAnswer);
} void SmartRadio::start_alerttimer(long sec, long usec)
{
  OTCLIB_TRACER(RADIO_TRACE>2) << "Radio: " << _rid;
  OTCLIB_TRACER(RADIO_TRACE>2) << ", SmartRadio::start_alerttimer()" << endl;
  Dispatcher::instance().startTimer(
                                                          sec, usec,
                                                          _iohalertTimer, Dispatcher::VolatileType
                                                          );
}
void SmartRadio::stop_alerttimer()
{
  OTCLIB_TRACER(RADIO_TRACE>2) << "Radio: " << _rid;
  OTCLIB_TRACER(RADIO_TRACE>2) << ", SmartRadio::stop_alerttimer()" << endl;
  Dispatcher::instance().stopTimer(_iohalertTimer);
```

```cpp
}
void SmartRadio::stop_wait_for_cfg()
{
  OTCLIB_TRACER(RADIO_TRACE>2) << "Radio: " << _rid;
  OTCLIB_TRACER(RADIO_TRACE>2) << ", SmartRadio::stop_wait_for_cfg()" << endl << endl;
  stop_cfgtimer();
} void SmartRadio::wait_for_cfg()
{
  OTCLIB_TRACER(RADIO_TRACE>2) << "Radio: " << _rid;
  OTCLIB_TRACER(RADIO_TRACE>2) << ", SmartRadio::wait_for_cfg()" << endl << endl;
  start_cfgtimer();
} void SmartRadio::cfg_timer(long sec, long usec)
{
  OTCLIB_TRACER(RADIO_TRACE>2) << "Radio: " << _rid;
  OTCLIB_TRACER(RADIO_TRACE>2) << ", SmartRadio::cfg_timer()" << endl << endl;
  sec,usec;

// config the radio
  stop_cfgtimer();
  cfg_radio();
  set_state(RdoConfiguring);
} void SmartRadio::start_cfgtimer(long sec, long usec)
{
  OTCLIB_TRACER(RADIO_TRACE>2) << "Radio: " << _rid;
  OTCLIB_TRACER(RADIO_TRACE>2) << ", SmartRadio::start_cfgtimer()" << endl;

stop_cfgtimer();
  Dispatcher::instance().startTimer(
                                    sec, usec,
                                    _iohcfgTimer,
            Dispatcher::VolatileType
                                    );
} void SmartRadio::stop_cfgtimer()
{
  OTCLIB_TRACER(RADIO_TRACE>2) << "Radio: " << _rid;
  OTCLIB_TRACER(RADIO_TRACE>2) << ", SmartRadio::stop_cfgtimer()" << endl;

Dispatcher::instance().stopTimer(_iohcfgTimer);
} void SmartRadio::start_dnld_image()
```

```
{
  OTCLIB_TRACER(RADIO_TRACE>2) << "SmartRadio::start_dnld_image()" << endl;
  if (get_state() != RdoDnlding) {
      _pktseqno   = 0;
      _sendRetries = 0;
      _smcell->start_dnld_rdoimage(_rid);
  }
}
void SmartRadio::dnld_ack()
{
  OTCLIB_TRACER(RADIO_TRACE) << "SmartRadio::dnld_ack()";
  OTCLIB_TRACER(RADIO_TRACE) << ", Seq No: " << _frm.get_seqno() << endl;

if (_frm.get_ackflag()) {
        int sqn = _frm.get_seqno();
        if (sqn >= _pktseqno) {
          stop_dnldtimer();
          _pktseqno = sqn+1;
          if (_pktseqno < _smcell->_rpl->count()) {
              _smcell->send_rdopkt(_rid, _pktseqno);
              _smcell->send_radio_scellpkt_status(_rid, _pktseqno, _smcell->_rpl-
>count());
              _sendRetries = 0;
              start_dnldtimer(_dnldTimerInt);
          }
          else {
              OTCLIB_TRACER(RADIO_TRACE) << "Radio: " << _rid;
              OTCLIB_TRACER(RADIO_TRACE) << " downloaded Successfully !"
<<endl;
              set_state(RdoDnldOk);
              _isLoaded = 1;
          }
        }
        else if (sqn == (_pktseqno - 1) ) {
          stop_dnldtimer();
          _pktseqno = sqn;
          if (_pktseqno < _smcell->_rpl->count()) {
              _smcell->send_rdopkt(_rid, _pktseqno);
              _smcell->send_radio_scellpkt_status(_rid, _pktseqno, _smcell->_rpl-
>count());
              _sendRetries = 0;
              start_dnldtimer(_dnldTimerInt);
          }
          else {
              OTCLIB_TRACER(RADIO_TRACE) << "Radio: " << _rid;
              OTCLIB_TRACER(RADIO_TRACE) << " downloaded Successfully !"
<<endl;
              set_state(RdoDnldOk);
              _isLoaded = 1;
          }
        }
  }
}
```

```
}
const char* SmartRadio::get_strstate() const
{
  return RdoStStr[get_state()];
} int SmartRadio::is_rdoincall() const
{
  return (get_state() > RdoIdle && get_state() < RdoDown);
} int SmartRadio::dnld_image(const char* imagefilename)
{
  if (imagefilename) strcpy(_imagefile, imagefilename);
  return _smcell->dnld_file(_imagefile, _rid);
} void SmartRadio::cfg_radio()
{
  _smcell->msg2bss_cfgradio(
                                        _rid,
                                        _rdocfg._type,
                                        _rdocfg._sat,
                                        _rdocfg._pwr,
                                        _rdocfg._chnl,
                                        _rdocfg._mode,
                                        _rdocfg._aveprd,
                                        _rdocfg._diff,
                                        _rdocfg._dcc
                                        );
} int SmartRadio::load_statetbl(const char* tblname)
{

_fsm->reg_statetbl(
                                        RdoIdle,
                                        AtgEvOrig,
                                        RdoOriginating,
                                        new ActionCallback(SmartRadio)( this, &SmartRadio::cellmsg_orig )
                                                );
_fsm->reg_statetbl(
                                        RdoOriginating,
                                        AtgEvOnChan,
                                        RdoOnChannel,
                                        new ActionCallback(SmartRadio)(
```

```
                    this,

&SmartRadio::cellmsg_onchan

)
                                        );
#if 0
   _fsm->reg_statetbl(
                                        AnyState,
                                        AtgEvTerm,
                                        RdoWaitRelConf,
                                        new ActionCallback(SmartRadio)( this, &SmartRadio::cellmsg_term )
                                        );
endif _fsm->reg_statetbl(
                                        RdoOnChannel,
                                        MccEvAccept,
                                        RdoSpeech,
                                        new ActionCallback(SmartRadio)( this, &SmartRadio::stop_origtimer

)
                                        );

_fsm->reg_statetbl(
                                        AnyState,
                                        MccEvRelReq,
                                        AnyState,
                                        new ActionCallback(SmartRadio)( this, &SmartRadio::mccmsg_relreq

)
                                        );

// handle trunk to mobile calls

//------ radio responded to the page
   _fsm->reg_statetbl(
                                        RdoIdle,
                                        AtgEvPageResp,
```

```
                              RdoPageResped,
                              new ActionCallback(SmartRadio)( this, &SmartRadio::cellmsg_pageresp )
                                        );
//------ radio tuned to the assigned voice channel
_fsm->reg_statetbl(
                              RdoPageResped,
                              AtgEvOnChan,
                              RdoAlerting,
                              new ActionCallback(SmartRadio)( this, &SmartRadio::cellmsg_pgonchan )
                                        );
//------ radio answered the alert
_fsm->reg_statetbl(
                              RdoAlerting,
                              AtgEvAnswer,
                              RdoSpeech,
                              new ActionCallback(SmartRadio)( this, &SmartRadio::cellmsg_answer

)
                                        );

//------ handle some stat and level change message
//------ update the radio status at any time
_fsm->reg_statetbl(
                              AnyState,
                              AtgEvRadioStat,
                              AnyState,
                              new ActionCallback(SmartRadio)( this, &SmartRadio::cellmsg_radiostat

)
                                        );

//------ update the mobile's receiving or SAT indicator
_fsm->reg_statetbl(
                              AnyState,
```

```
                                        AtgEvLevelChg,
                                        AnyState,
                                        new ActionCallback(SmartRadio)( this, &SmartRadio::cellmsg_lvlchg )
                                                );
//------ update the mobile's receiving or RSSI indicator
_fsm->reg_statetbl(
                                        AnyState,
                                        AtgEvMeasAck,
                                        AnyState,
                                        new ActionCallback(SmartRadio)( this, &SmartRadio::cellmsg_measack

)
                                                );

//------ downloading
_fsm->reg_statetbl(
                                        AnyState,
                                        AtgEvDnldRadio,
                                        RdoDnlding,
                                        new ActionCallback(SmartRadio)( this, &SmartRadio::start_dnld_image

)
                                                );

_fsm->reg_statetbl(
                                        AnyState,
                                        AtgEvDnldAck,
                                        AnyState,
                                        new ActionCallback(SmartRadio)( this, &SmartRadio::dnld_ack )
                                                );
return 0;
}
```

The third object-component to the software applications of the adjunct node-processor 12 is the matrix-switch interface object software application. This component like the cell-site interface objects application, also includes an embedded state table in the object-software for creating a pointer. The following is the software listing of the matrix-switch interface object software application with its embedded state table.

```
#include "exclient/exCallHandler.h"
#include <OTC/collctn/prmodifr.hh>
#include "exclient/exPort.h"
#include "exclient/exhandler.h"

exCallHandler::exCallHandler()
{
} exCallHandler::~exCallHandler()
{
} void exCallHandler::parent(exhandler* p)
{
    _parent = p;
} int exCallHandler::deleteCall(unsigned long cid)
{
    if(callId2portMap.contains(cid) == OTCLIB_TRUE)
    {
        OTC_Modifier<int> mainIter = getPortIter(cid);
        OTC_List<int> tmpList;
        for(mainIter.reset(); mainIter.isValid(); mainIter.next())
        {
            tmpList.addLast(mainIter.item());
        }
        OTC_Modifier<int> iter = tmpList.items();
        for(iter.reset(); iter.isValid(); iter.next())
        {
            deletePortFromCall(cid, iter.item());
        }
    }
    return 0;
} int exCallHandler::addPortToCall(unsigned long cid, int port)
{
    OTC_List<int>* tmpList;

if(port2callIdMap.contains(port) == OTCLIB_TRUE)
    {
        unsigned long badCallId = port2callIdMap.item(port);
        deleteCall(badCallId);
        cout << "duplicate port in exCallHandler::addPortToCall cid = ";
        cout << cid << ", port = " << port << endl;
    } port2callIdMap.add(port, cid);

if(callId2portMap.contains(cid) == OTCLIB_TRUE)
```

```
    {
        tmpList = callId2portMap.item(cid);
    }
    else
    {
        tmpList = new OTC_List<int>;
        callId2portMap.add(cid, tmpList);
    }
    tmpList->addLast(port);

return 0;
} int exCallHandler::deletePortFromCall(unsigned long cid, int port)
{
    if(port2callIdMap.contains(port))
    {
        _parent->dialPlan()->setPortState(port, exPort::PORT_IS);
        port2callIdMap.remove(port);
    } if(callId2portMap.contains(cid))
    {
        OTC_List<int>* tlist = callId2portMap.item(cid);

OTC_Modifier<int> iter = tlist->items();

u_int i = 0;
        for(iter.reset(); iter.isValid(); iter.next())
        {
            if(iter.item() == port)
            {
                tlist->removeItem(i);
                break;
            }
            i++;
        } if(tlist->population() == 0)
        {
            callId2portMap.remove(cid);
        }
    }
    return 0;
} unsigned long exCallHandler::getCallId(int port)
{
    if(port2callIdMap.contains(port))
    {
        return(port2callIdMap.item(port));
    }
    else
    {
```

```
        return(0xffffffff);
    }
}

OTC_Modifier<int> exCallHandler::getPortIter(unsigned long cid)
{
    if(callId2portMap.contains(cid) == OTCLIB_TRUE)
    {
        return(callId2portMap.item(cid)->items());
    }
    return(emptyList.items());
} void exCallHandler::print()
{
    OTC_Modifier<OTC_List<int>*> mapIter = callId2portMap.items();

cout << "callId2portMap:" << endl;

for(mapIter.reset();mapIter.isValid();mapIter.next())
    {
        cout << "new call id";
        OTC_Modifier<int> listIter = mapIter.item()->items();
        for(listIter.reset();listIter.isValid();listIter.next())
        {
            cout << " " << listIter.item();
        }
        cout << endl << endl;
    } cout << "port2callIdMap:" << endl;
    OTC_Modifier<unsigned long> pmapIter = port2callIdMap.items();
    for(pmapIter.reset();pmapIter.isValid();pmapIter.next())
    {
        cout << pmapIter.item() << ": ";
        OTC_Modifier<int> listIter =
            callId2portMap.item(pmapIter.item())->items();
        for(listIter.reset();listIter.isValid();listIter.next())
        {
            cout << " " << listIter.item();
        }
        cout << endl;
    }
} void exCallHandler::deleteAllCalls()
{
    OTC_PairModifier<unsigned long, OTC_List<int>*> mapIter =
        callId2portMap.pairs();
```

```
for(mapIter.reset();mapIter.isValid();mapIter.next())
{
    unsigned long cid = mapIter.key();
    cout << "Deleting Call " << cid << endl;
    _parent->getMsgObj(0x08)->emergencyRelease(cid);
    deleteCall(cid);
}

}
```

As discussed previously, since the node-controller 12 of each hub-site performs all of the central operational and control functions for each node, or hub, the system of the invention is able to interconnect many nodes of many hubs together to form one whole system. Such a system may encompass an entire geographical area, such as a country, whereby the entire country is linked together by the system of the invention.

Figure 5:
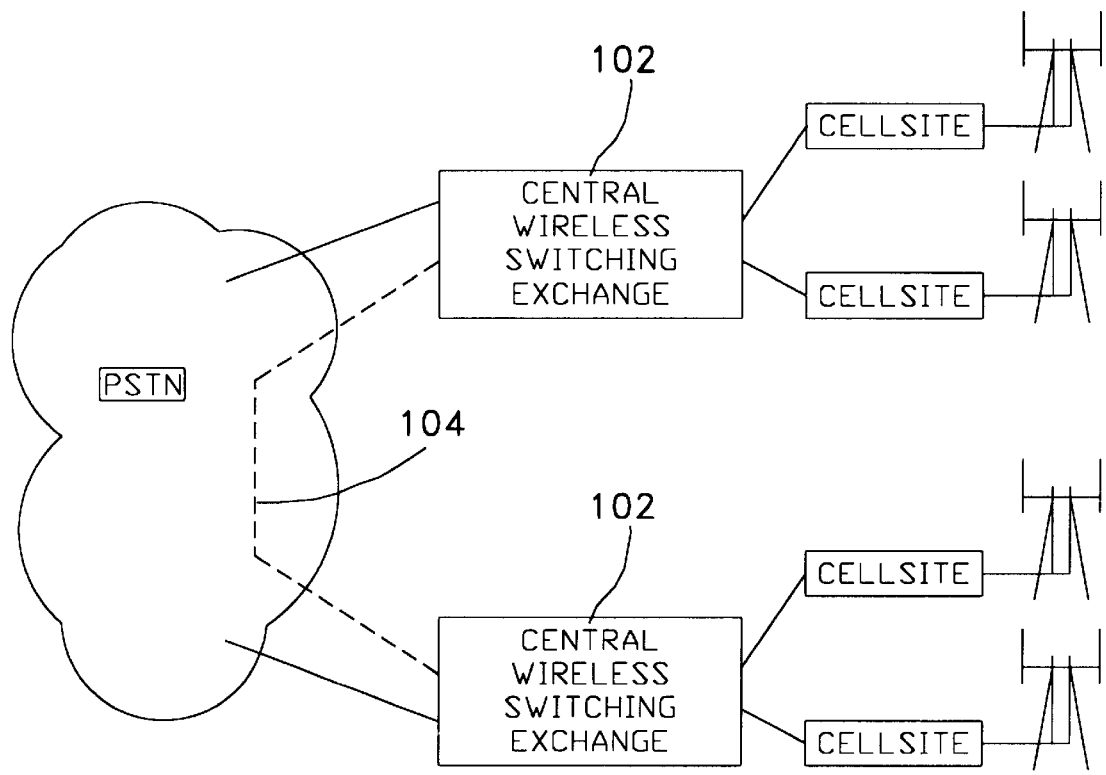
FIG. 5 is a block diagram showing a prior-art multi-node system.

Traditional embodiments of wireless telephony communication systems, such as cellular, typically utilize modified wireline telephony switch equipment to perform additional functions related to wireless and mobile-phone operation. The modifications to such wireline switching equipment allow the switching equipment to connect cell-sites, where the R.F. equipment is located, and which communicates with the mobile-phone subscribers. In addition, the switch generally contains additional capabilities to support mobility; essentially, this involves the re-connection of calls as mobile users move from one cell-site to another cell-site, or call hand-off, along with inter-operation with other mobile system-switches for the purpose of call-delivery, roamer-validation, and billing. Inter-system operation in North America, for example, typically uses the industry standard "Signaling System Seven" (SS7) suite of protocols for messaging and call control. These prior-art systems use a centralized system architecture, with complex and costly interconnection between switching exchange nodes according to defined industry-standards, in order to achieve wide-area operation. FIG. 5 depicts such a prior art system, where two such wireless switching exchange nodes 100, 102 are connected together via a SS7 link 104. The system of the invention uses a totally different architecture, as shown in FIG. 6.

The architecture of the system of the invention follows the principle that the system nodes are essentially standard personal computers, which control call-processing functions locally, but communicate and interact with each other using over the internode message-links, using standard computer data networking components. This represents a major cost saving over the traditional architecture which must use costly, dedicated SS7 links, or possibly X.25 data network. In addition to cost savings, the internal node structure of the invention is architectured such that the network can support configurations and capabilities that are not practical in traditional architectures. This is achieved by ensuring, in the software design, that all processes can execute on any node in the system. In the system of the invention, separate software processes are defined which handle call processing, subscriber and system equipment administration, and roaming control (i.e. home-location register/visitor-location register). Being able to operate on any node in the system, means that a spatially-redundant network-architecture is possible. In the event of a failure of network roaming-control on one roaming node's computer, a redundant roaming control-process on a designated back-up node elsewhere can take over and ensure continued operation. Prior-art systems provide only back-up by duplication of the hardware and software, at the system location only; if the location suffers a catastrophic event (e.g. fire, earthquake, terrorist blast, etc.), then, operation is lost, since both the main and back-up components are compromised.

Figure 6:
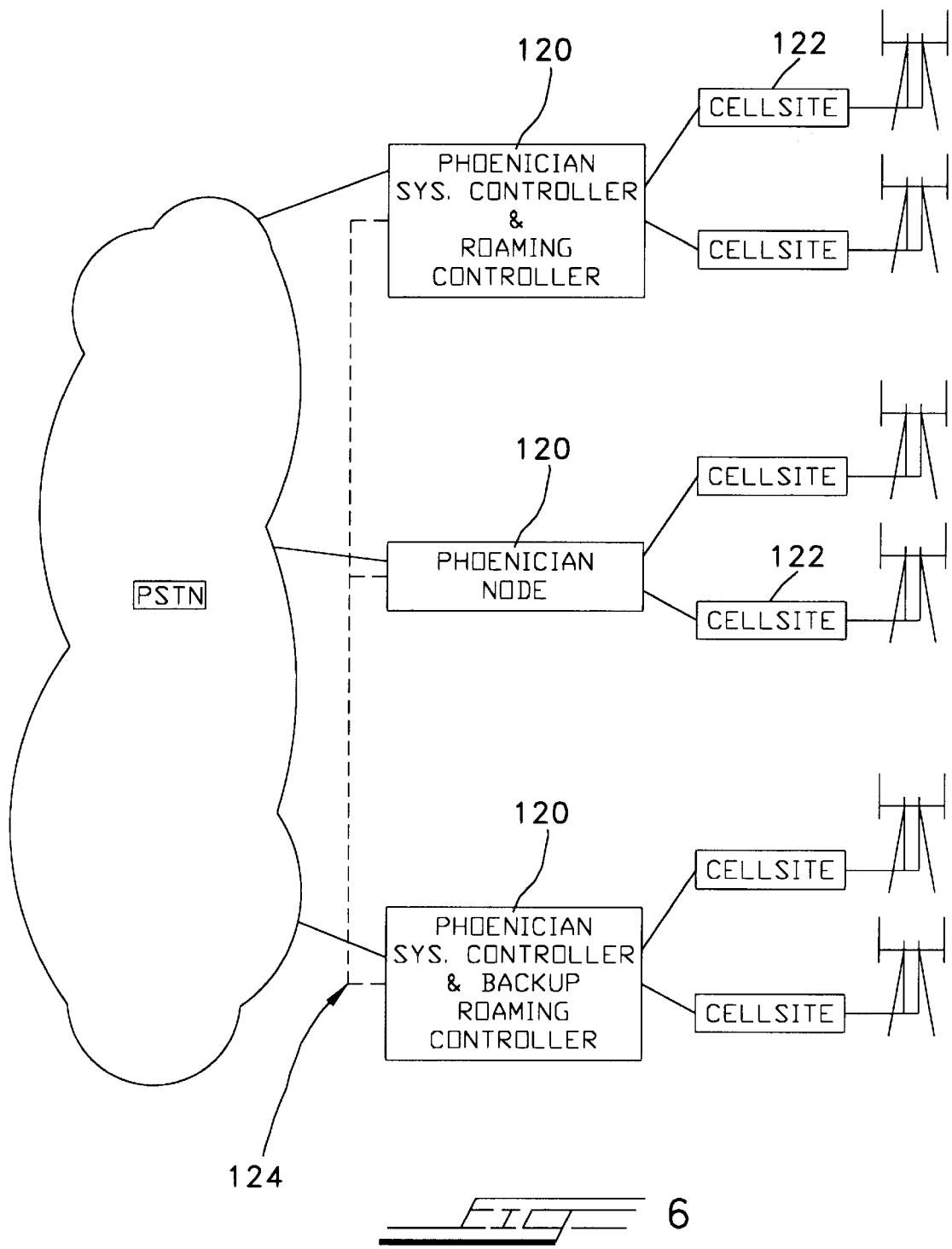
FIG. 6 is a block diagram showing a multi-node system of the present invention.

Referring now to FIG. 6, the nodal, architectural network of the invention is shown, which is comprised of many adjunct node-processors 120, each serving a plurality of cell-sites 122. Each adjunct node-processor is linked conventionally to the PSTN, and, moreover, to each adjunct node-processor of all of the many other hubs of the network, by an internode message link 124. Thus, when any one adjunct node-processor of a hub fails or must be shut down, all of its functions may be taken over by the adjunct node-processor of a neighboring hub, including the functions of call-processing, billing, roaming, etc.

An additional feature of the system of the invention is concerned with integral, hierarchical, generic alarm-management. As discussed above, the system of the invention allows internodal connection between all of the adjunct node-processors personal computers of all of the hubs of the network. Such architecture of the invention, therefore, allows for any one adjunct node-processor of one hub to take over the alarm-management functions of another adjunct node-processor of a different hub. Alarm-management functions of a adjunct node-processor monitor for the proper operations and functioning of each base station of a cell-site linked to it, and the switching matrix equipment coupled it to the PSTN, as well as monitoring itself for proper operation.

Figure 7:
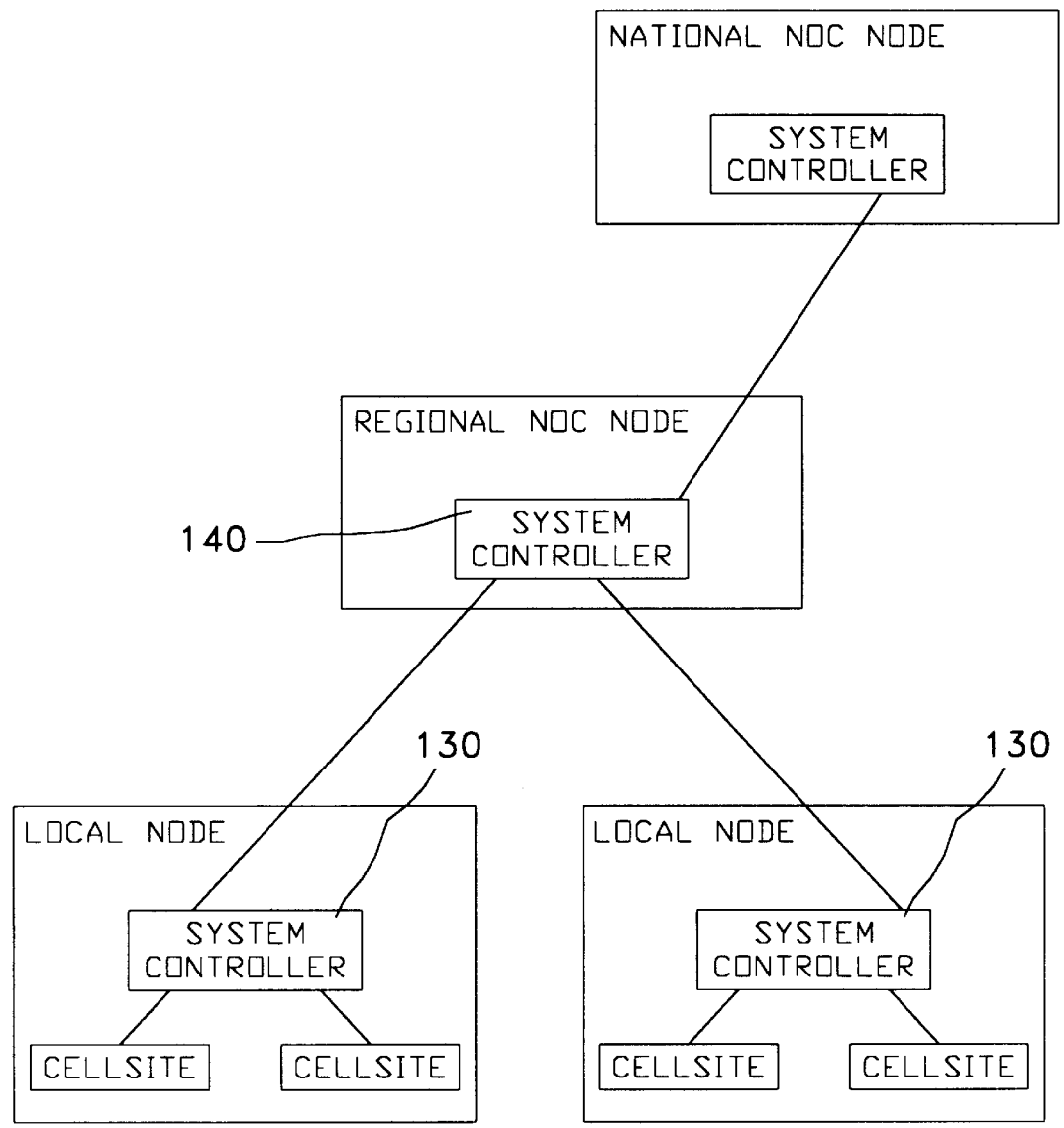
FIG. 7 is a block diagram showing the integral, hierarchical, generic alarm-management system according to the invention.
Figure 8:
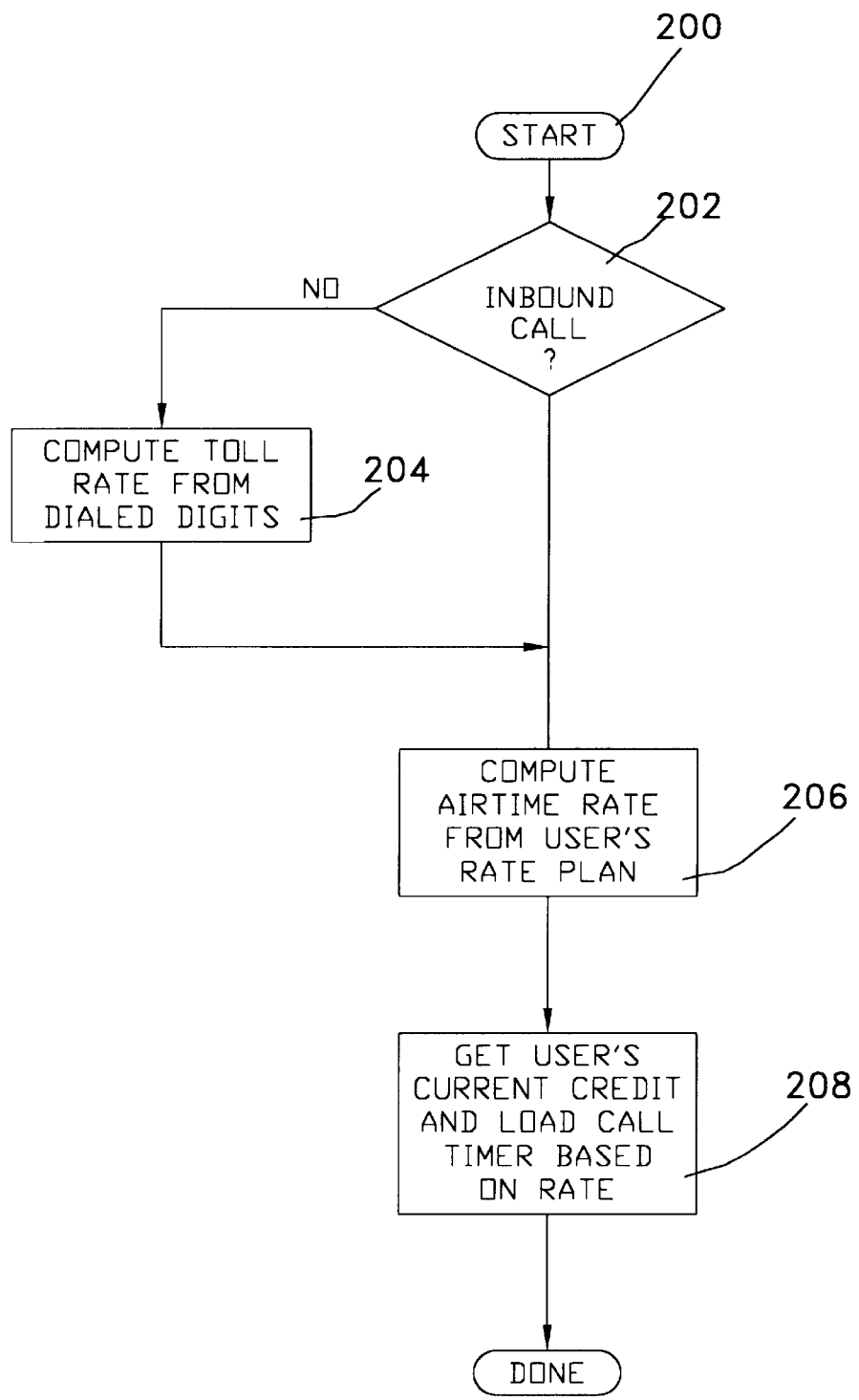
FIGS. 8–10 are flow charts showing the call-flow logic operation for the debit-billing portion of the software of the invention.

Referring to FIG. 7, the multinode architecture of the invention allows for the exchange of alarm-information between nodes 130 over the internode links, as discussed above. This arrangement yields a simple, yet flexible, hierarchical alarm-management system capable of providing round-the-clock alarm-management for systems around the world. In the embodiment shown in FIG. 7, each node system-controller 130 in the network, which includes the Network Operations Center's (NOC) system-controller, has a copy of the generic, alarm-handler process running. The alarm-handler process can accept alarm-input messages from both peripheral system equipment at that node (i.e. base stations, switch component, etc.) or from other nodes in the system. The alarm-handler uses a lookup into a database to determine the appropriate action to be taken upon receipt of an alarm-message. Depending on the configuration defined by the network operator, this may include sending an alpha-numeric message to a defined pager number, sending a fax to a defined fax-number, playing an audio file on the adjunct node-processor, or sending e-mail with alarm-details to a defined e-mail address. In addition, the alarm-handler can simply forward the message to other nodes, as defined in the alarm-profile. In operation, at a local node, each alarm-signal received by the adjunct node-processor thereof is forwarded to the regional control center 140. From this center, only high-priority and critical alarms are forwarded to the national NOC 150. The NOC system-controller may be configured to forward critical, priority alarms to the world headquarters.

The software listing for this alarm-management is shown hereinbelow.

 chris @ wormhole.pwgi.com (Chris Matthies)
07/03/96 11:36 AM

To: gullifor @ pwgi.com @ inet
cc: (bcc: Dan Gulliford/Phoenix Wireless Group Inc)
Subject: patent again....

- - - - - - - - - -
X-Sun-Data-Type: text
X-Sun-Data-Description: text
X-Sun-Data-Name: text
X-Sun-Charset: us-ascii
X-Sun-Content-Lines: 1

Here you go......
- - - - - - - - - -
X-Sun-Data-Type: default
X-Sun-Data-Description: default
X-Sun-Data-Name: AlmMsgKit.C
X-Sun-Charset: us-ascii
X-Sun-Content-Lines: 666

```
#include <unistd.h>
#include <fstream.h>
#include "alarm/AlmMsgKit.h"
#include "alarm/Alarm.h"
#include "alarm/AlmEntry.h"
#include "utlLib/sysincludes.h"

//extern "C" int gettimeofday (struct timeval *tp);

// globals...
extern Dispatcher    *disp;
extern OTC_TraceTag ALARM_TRACE;
extern TTIPC        *ipc;

// io handlers for the alarm message kits
ImplementActionCallback(AudioMsgkit);
ImplementIOCallback(AudioMsgkit);

/*
-----------------------------------------------------------------
---------------*/
AudioMsgkit::AudioMsgkit()
     : _actionSec(30), _actionUSec(0), _active(1), _playioh(0), _timerActive(0)
```

```
{

}
/* ------------------------------------------------------------
   ---------------*/
AudioMsgkit::~AudioMsgkit()
{
        if ( _timerActive )
                cancel();

// remove the action for play timer
        delete _playioh;
}
/* ------------------------------------------------------------
   ---------------*/
int
AudioMsgkit::init(Alarm *alm, AlmEntry *almEntry)
{
        // extract the audio info from the
        // the alarm entry
        if ( !almEntry->audio() ) {
                _active = 0;
                return 1;
        }

// pointer to parent alarm incase needed
        _parent = alm;

// build a file using the name of the alarm
        SPString aname  = _parent->name();
        aname          += ".au";
        set_audio_file(aname);

// audio required so get timer value
        if ( almEntry->level() == AlmEntry::ALARM_LEVEL_INFO ){
                set_timer_values("ALARM_INFO_TIMER");
                if ( access(_auFile, F_OK) == -1 )
                        set_audio_file("information.au");
        }
        else if ( almEntry->level() == AlmEntry::ALARM_LEVEL_WARN ){
                set_timer_values("ALARM_WARN_TIMER");
                if ( access(_auFile, F_OK) == -1 )
```

```
                set_audio_file("warning.au");
        }
        else if ( almEntry->level() == AlmEntry::ALARM_LEVEL_CRITICAL ){
                set_timer_values("ALARM_CRITICAL_TIMER");
                if ( access(_auFile, F_OK) == -1 )
                        set_audio_file("critical.au");
        }

// set the volume for the audio
        set_audio_gain();

// create an io handler for the timer
        _playioh = new IOCallback(AudioMsgkit)(this,&AudioMsgkit::play_timer);
        return 1;
}
/*
-----------------------------------------------------------------
----------------*/
int
AudioMsgkit::execute(int arg)
{
        // temporary hack till audio ready
        SPString cmd = "cat ";
        cmd         += _auFile + " > /dev/audio &";
        ::system(cmd);
        return 1;
}
/*
-----------------------------------------------------------------
----------------*/
int
AudioMsgkit::schedule()
{
        disp->startTimer(_actionSec, _actionUSec, _playioh, Dispatcher::PermanentType);
        _timerActive = 1;
        return 1;
}
/*
-----------------------------------------------------------------
----------------*/
int
AudioMsgkit::cancel()
{
        disp->stopTimer(_playioh);
        _timerActive = 0;
        return 1;
```

```
}
/*
------------------------------------------------------------
---------------*/
void
AudioMsgkit::play_timer(long sec, long usec)
{
        // play the audio file
        execute();
}
/*
------------------------------------------------------------
---------------*/
void
AudioMsgkit::set_audio_file(const char *fname)
{
        // get the full path to the file name
        char *tmp;
        _auFile = (tmp = getenv("WACS_HOME")) != 0 ? tmp : "/src/work/WACS";
        _auFile += "/sounds/";
        _auFile += fname;
}
/*
------------------------------------------------------------
---------------*/
void
AudioMsgkit::set_timer_values(const char *env)
{
        char *tmp;
        _actionSec = (tmp = getenv(env)) != 0 ? atoi(tmp) : 30;

}
/*
------------------------------------------------------------
---------------*/
void
AudioMsgkit::set_audio_gain()
{

}
/*
------------------------------------------------------------
---------------*/
int
```

```
AudioMsgkit::status()
{
        return _active;
}
/*
-----------------------------------------------------------
---------------*/
//                  ••••••••••••••••• GUI   Message   Kit ••••••••••••••••
/*
-----------------------------------------------------------
---------------*/
GuiMsgkit::GuiMsgkit()
        : _parent(0), _active(1)

{

}
/*
-----------------------------------------------------------
---------------*/
GuiMsgkit::~GuiMsgkit()
{
}
/*
-----------------------------------------------------------
---------------*/
int
GuiMsgkit::init(Alarm *alm, AlmEntry *almEntry)
{
        // pointer to parent alarm incase needed
        _parent = alm;

return 1;
}
/*
-----------------------------------------------------------
---------------*/
int
GuiMsgkit::execute(int arg)
{
        ipc->create_msg();
        *ipc << _parent->id() << _parent->name()
                << _parent->supplement() << _parent->date() << _parent->level();
        ipc->send_msg(Alm2AlmGuiNewAlarm);
```

```cpp
        return 1;
}
/* ----------------------------------------------------------
   --------------- */
int
GuiMsgkit::schedule()
{
        // NOOP
        return 1;
}
/* ----------------------------------------------------------
   --------------- */
int
GuiMsgkit::cancel()
{
        // tell the gui were clearing the alarm
        ipc->create_msg();
        *ipc << _parent->id();
        ipc->send_msg(Alm2AlmGuiDeleteAlarm);

return 1;
}
/* ----------------------------------------------------------
   --------------- */
int
GuiMsgkit::status()
{
        return _active;
}

/* ----------------------------------------------------------
   --------------- */
//      *************** Printer Message Kit ***************
/* ----------------------------------------------------------
   --------------- */
AlmPrinterMsgkit::AlmPrinterMsgkit()
        : _parent(0), _active(1)

{

}
/*
```

```
/* ----------------------------------------------------------------
   ---------------*/
AlmPrinterMsgkit::~AlmPrinterMsgkit()
{
}
/*
------------------------------------------------------------------
---------------*/
int
AlmPrinterMsgkit::init(Alarm *alm, AlmEntry *almEntry)
{
        // extract the audio info from the
        // the alarm entry
        if ( !almEntry->printer() ) {
                _active = 0;
                return 1;
        }
        _almEntry = almEntry;

// pointer to parent alarm incase needed
        _parent = alm;

return 1;
}
/*
------------------------------------------------------------------
----------------*/
int
AlmPrinterMsgkit::execute(int arg)
{
        // open a file to place the report data
        SPString compFile = "/tmp/almprinter.tmp";
        ofstream ofs(compFile);
        if ( !ofs ){
                return 0;
        }

// insert the report header
        SPString header = ".de TP\n";
        ofs << header;
        header = ".po 1.25i\n";
        ofs << header;
        header = ".lt \\\\n[@ll]u\n";
        ofs << header;
        header = ".ie ((\\\\n[%]=1)&(\\\\n[N]=1):(\\\\n[N]=2))  .sp\n";
        ofs << header;
```

```
header = ".el .tl \\\\*[pg*header]\n";
ofs << header;
header = ".ie o .tl \\\\*[pg*odd-header]\n";
ofs << header;
header = ".el .tl \\\\*[pg*even-header]\n";
ofs << header;
header = ".sp 2\n";
ofs << header;
header = "..\n";
ofs << header;
header = ".S 14 15\n";
ofs << header;
header = ".PH \"\"\n";
ofs << header;
header = ".ce\n";
ofs << header;

// troff bold labels
SPString beginBold = "\\f3";
SPString endBold   = "\\f1";

SPString body = beginBold + "WCP Alarm Report";
body += endBold;
body += "\n";
body += ".sp 3\n";
body += ".S 12 13\n";
ofs << body;

body = beginBold + "Alarm ID: ";
body += endBold;
body += _parent->id();
body += "\n.sp\n";
ofs << body;

body = beginBold + "Alarm Name: ";
body += endBold;
body += _parent->name();
body += "\n.sp\n";
ofs << body;

body = beginBold + "Alarm Date: ";
body += endBold;
body += _parent->date();
body += "\n.sp\n";
ofs << body;
```

```
        // determin the priority of the message
        SPString pri;
        if( _almEntry->level() == AlmEntry::ALARM_LEVEL_INFO )
                pri = "Informational";
        else if( _almEntry->level() == AlmEntry::ALARM_LEVEL_WARN )
                pri = "Warning";
        else if( _almEntry->level() == AlmEntry::ALARM_LEVEL_CRITICAL )
                pri = "Critical";

body = beginBold + "Alarm Level: ";
        body += endBold;
        body += pri;
        body += "\n.sp\n";
        ofs << body;

body = beginBold + "Process Message: ";
        body += endBold;
        body += _parent->supplement();
        body += "\n.sp\n";
        ofs << body;

body = beginBold + "Description: ";
        body += endBold;
        body += "\n";
        body += "\n.sp .5\n";
        body += _almEntry->description();
        ofs << body;

ofs.close();

// now build the command to print the file
        char *tmp;
        SPString cmd    = (tmp = getenv("WCP_ALARM_PRINT_FMT_CMD"))
                ? tmp : "/usr/local/bin/groff -mgm";
        SPString printer = (tmp = getenv("WCP_PRINTER"))
                ? tmp : "lp";
        cmd        += " ";
        cmd        += compFile + " | ";
        cmd        += printer;
        cout << "cmd: " << cmd << endl;
        ::system(cmd);

return 1;
}
/*
```

```
 ---------------*/
int
AlmPrinterMsgkit::schedule()
{
      // NOOP
      return 1;
}
/*
 ------------------------------------------------------------
 ---------------*/
int
AlmPrinterMsgkit::cancel()
{
      // NOOP
      return 1;
}
/*
 ------------------------------------------------------------
 ---------------*/
int
AlmPrinterMsgkit::status()
{
      return _active;
}
/*
 ------------------------------------------------------------
 ---------------*/
//    ***************  E-Mail  Message  Kit  ****************
/*
 ------------------------------------------------------------
 ---------------*/
AlmMailMsgkit::AlmMailMsgkit()
      : _parent(0), _active(1)

{

}
/*
 ------------------------------------------------------------
 ---------------*/
AlmMailMsgkit::~AlmMailMsgkit()
{
}
/*
 ------------------------------------------------------------
 ---------------*/
```

```
int
AlmMailMsgkit::init(Alarm *alm, AlmEntry *almEntry)
{
        // extract the audio info from the
        // the alarm entry
        if ( !almEntry->mail() ) {
                _active = 0;
                return 1;
        }
        _almEntry = almEntry;

// pointer to parent alarm incase needed
        _parent = alm;

return 1;
}
/*
------------------------------------------------------------
---------------*/
int
AlmMailMsgkit::execute(int arg)
{
        // open a file to place the report data
        SPString compFile = "/tmp/almmail.tmp";
        ofstream ofs(compFile);
        if ( !ofs ){
                return 0;
        }

SPString body = "From: WCP Alarm Daemon\n";
        ofs << body;

body = "Subj: WCP Alarm Report\n\n";
        ofs << body;

body = "Alarm ID: ";
        body += _parent->id();
        body += "\n";
        ofs << body;

body = "Alarm Name: ";
        body += _parent->name();
        body += "\n";
        ofs << body;

body = "Alarm Date: ";
```

```
        body += _parent->date();
        body += "\n";
        ofs << body;

// determin the priority of the message
        SPString pri;
        if( _almEntry->level() == AlmEntry::ALARM_LEVEL_INFO )
                pri = "Informational";
        else if( _almEntry->level() == AlmEntry::ALARM_LEVEL_WARN )
                pri = "Warning";
        else if( _almEntry->level() == AlmEntry::ALARM_LEVEL_CRITICAL )
                pri = "Critical";

body = "Alarm Level: ";
        body += pri;
        body += "\n";
        ofs << body;

body = "Process Message: ";
        body += _parent->supplement();
        body += "\n";
        ofs << body;

body = "Description: ";
        body += "\n";
        body += _almEntry->description();
        ofs << body;

ofs.close();

// now build the command to print the file
        SPString cmd   = "/bin/mail < " ;
        cmd           += compFile + " ";
        cmd           += _almEntry->mail_address();
        cout << "cmd: " << cmd << endl;
        ::system(cmd);

return 1;
}
/* ---------------------------------------------------------------
   ---------------- */
int
AlmMailMsgkit::schedule()
{
        // NOOP
```

```
        return 1;
}
/*
................................................................
..................*/
int
AlmMailMsgkit::cancel()
{
        // NOOP
        return 1;
}
/*
................................................................
..................*/
int
AlmMailMsgkit::status()
{
        return _active;
}

/*
................................................................
..................*/
//         *************** Log/Database  Message  Kit ****************
/*
................................................................
..................*/
AlmLogMsgkit::AlmLogMsgkit()
        : _parent(0), _active(1)

{

}
/*
................................................................
..................*/
AlmLogMsgkit::~AlmLogMsgkit()
{
        // remove this alarm from the active db
        // and add a message to the log file that
        // a clear/acknowledge has been received
        remove_active_alarmdb();
        update_log_file();
}
/*
```

```c
/* ----------------------------------------
   ---------------- */
int
AlmLogMsgkit::init(Alarm *alm, AlmEntry *almEntry)
{
        _almEntry = almEntry;

// pointer to parent alarm incase needed
        _parent = alm;

return 1;
}
/* ----------------------------------------------------------------------
   ---------------- */
int
AlmLogMsgkit::execute(int arg)
{
        if ( !arg ) {

// store data in active alarm data base
                store_active_alarmdb();

// store data in log file
                store_log_file();
        } return 1;
}
/* ----------------------------------------------------------------------
   ---------------- */
void
AlmLogMsgkit::store_active_alarmdb()
{
        // create an alarm entry and store in the
        // data base
        _parent->store();
}
/* ----------------------------------------------------------------------
   ---------------- */
void
AlmLogMsgkit::remove_active_alarmdb()
{
        // delete an alarm entry from the
        // data base
```

```
        _parent->remove();
}
/*
- - - - - - - - - - - - - - - - - - - - - - - - - - - - - - - - - - - - - - - - - - - - - - - - - - - - - - - - - - - -
- - - - - - - - - - - - - - - - */
void
AlmLogMsgkit::store_log_file()
{
        // open a file to place the report data
        set_log_file();
        ofstream ofs(_logFile, ios::app);
        if ( !ofs ){
                return;
        }

// create a header on the top of the page for column
        SPString body = "--- Alarm Id: ";
        body += _parent->id();

body += " Alarm Name: ";
        body += _parent->name();

body += " Alarm Date: ";
        body += _parent->date();

// determin the priority of the message
        SPString pri;
        if( _almEntry->level() == AlmEntry::ALARM_LEVEL_INFO )
                pri = "Informational";
        else if( _almEntry->level() == AlmEntry::ALARM_LEVEL_WARN )
                pri = "Warning";
        else if( _almEntry->level() == AlmEntry::ALARM_LEVEL_CRITICAL )
                pri = "Critical";

body += " Alarm Level: ";
        body += pri;

body += " Action: TRIGGERED";

body += " Process Message: ";
        body += _parent->supplement();

body += " Description: ";
        body += _almEntry->description();
        ofs << body << endl;
```

```
        ofs.close();
}
/*----------------------------------------------------------------
------------------*/
void
AlmLogMsgkit::update_log_file()
{
        // open a file to place the report data
        set_log_file();
        ofstream ofs(_logFile, ios::app);
        if ( !ofs ){
                return;
        }

// create a header on the top of the page for column
        SPString body = "--- Alarm Id: ";
        body += _parent->id();

body += " Alarm Name: ";
        body += _parent->name();

body += " Alarm Date: ";
        body += timestamp();

// determin the priority of the message
        SPString pri;
        if( _almEntry->level() == AlmEntry::ALARM_LEVEL_INFO )
                pri = "Informational";
        else if( _almEntry->level() == AlmEntry::ALARM_LEVEL_WARN )
                pri = "Warning";
        else if( _almEntry->level() == AlmEntry::ALARM_LEVEL_CRITICAL )
                pri = "Critical";

body += " Alarm Level: ";
        body += pri;

body += " Action: CLEARED";

ofs << body << endl;

ofs.close();
}
/*----------------------------------------------------------------
------------------*/
```

```
int
AlmLogMsgkit::schedule()
{
        // NOOP
        return 1;
}
/*
-----------------------------------------------------------------
---------------*/
int
AlmLogMsgkit::cancel()
{
        // NOOP
        return 1;
}
/*
-----------------------------------------------------------------
---------------*/
int
AlmLogMsgkit::status()
{
        return _active;
}
/*
-----------------------------------------------------------------
---------------*/
void
AlmLogMsgkit::set_log_file()
{
        // get the full path to the file name
        char *tmp;
        _logFile = (tmp = getenv("WACS_HOME")) != 0 ? tmp : "/src/work/WACS";
        _logFile += "/OAM/logs/wcp_alarm.log";
}
/*
-----------------------------------------------------------------
---------------*/
const char *
AlmLogMsgkit::timestamp()
{
        // get the current time
        char   timestring[30];
        timeval   cur_time;
        ::gettimeofday (&cur_time, 0);
        ::cftime(timestring, "%D %T", &(cur_time.tv_sec));
```

```
            _timestamp = timestring;

return (_timestamp);
}
----------
X-Sun-Data-Type: default
X-Sun-Data-Description: default
X-Sun-Data-Name: Alarm.C
X-Sun-Charset: us-ascii
X-Sun-Content-Lines: 143 include "OTC/debug/logstrm.hh"
include "OTC/debug/tracetag.hh"
#include "OTC/debug/tracer.hh"
#include "alarm/Alarm.h"
#include "alarm/AlmDaemon.h"
#include "alarm/AlmMsgKit.h"
#include "odbms/AlmProfDb.h"
#include "alarm/AlmEntry.h"
#include "odbms/AlmActiveDb.h"
#include "alarm/AlmSvcMsgKit.h"

// global variables
extern TTIPC        *ipc;
extern Dispatcher   *disp;
extern OTC_TraceTag ALARM_TRACE;

// static variables...
AlmSvcMsgKit *Alarm::_almSvcMsgKit = 0;
static const int TRIGGER = 1;
static const int CLEAR   = 0;

/*
-------------------------------------------------------------------
---------------*/
//  ******************** Alarm   Transaction  **************
/*
-------------------------------------------------------------------
---------------*/
Alarm::Alarm()
      : _almEntry(0), _almProfDb(0), _almActiveDb(0), _guiMsgKit(0)
{
      for ( int i = 0; i < NUM_ALARM_KITS; i++ )
            _almMsgKit[i] = 0;
}
/*
```

```
-------------------------------------------------------------
----------------*/
Alarm::~Alarm()
{
        if ( _guiMsgKit )
                delete _guiMsgKit;

for ( int i = 0; i < NUM_ALARM_KITS; i++ )
                if ( _almMsgKit[i] )
                        delete _almMsgKit[i];

// if the alarm service object exists transfer alarm data
        if ( _almSvcMsgKit )
                _almSvcMsgKit->send(CLEAR, id());
}
/*
-------------------------------------------------------------
----------------*/
int
Alarm::init(AlmDaemon *almd, SPString &aname, SPString &aid, AlmProfDb *aProfDb,
AlmActiveDb *aActiveDb)
{
        // get a handle to the profile data base
        _almProfDb   = aProfDb;
        _almActiveDb = aActiveDb;

// get the entry for this alarm
        if ( !_almProfDb->find(aname, _almEntry) )
                return 0;

// set id for this alarm
        _almId = aid;

// alarm daemon in client mode so init server connection
        if ( almd->alarm_client() && !_almSvcMsgKit ) {
                _almSvcMsgKit = new AlmSvcMsgKit;
                _almSvcMsgKit->init(almd);
        }

// create all the message kits
        _guiMsgKit    = new GuiMsgkit;
        _almMsgKit[0] = new AudioMsgkit;
        _almMsgKit[1] = new AlmPrinterMsgkit;
        _almMsgKit[2] = new AlmMailMsgkit;
        _almMsgKit[3] = new AlmLogMsgkit;
```

```
        // initialize the message kits
        _guiMsgKit->init(this, _almEntry);
        for ( int i = 0; i < NUM_ALARM_KITS; i++ )
                if ( _almMsgKit[i] )
                        _almMsgKit[i]->init(this, _almEntry);

return 1;
}
/* ----------------------------------------------------------------
   --------------- */
int
Alarm::trigger(int arg)
{
        // if the alarm service object exists transfer alarm data
        if ( _almSvcMsgKit && !arg )
                _almSvcMsgKit->send(TRIGGER, id(), name(), supplement());

// process each alarm accordingly
        for ( int i = 0; i < NUM_ALARM_KITS; i++ ) {
                if ( _almMsgKit[i] && _almMsgKit[i]->status() ) {
                        _almMsgKit[i]->execute(arg);
                        _almMsgKit[i]->schedule();
                }
        } return 1;
}
/* ----------------------------------------------------------------
   --------------- */
int
Alarm::acknowledge()
{
        // tell the gui to clear the alarm
        _guiMsgKit->cancel();

// process each alarm accordingly
        for ( int i = 0; i < NUM_ALARM_KITS; i++ ) {
                if ( _almMsgKit[i] && _almMsgKit[i]->status() )
                        _almMsgKit[i]->cancel();
        } return 1;
}
```

```
/*
-------------------------------------------------------
---------------*/
void
Alarm::display()
{
        _guiMsgKit->execute();
}
/*
-------------------------------------------------------
---------------*/
int
Alarm::level()
{
        return _almEntry->level();
}
/*
-------------------------------------------------------
---------------*/
void
Alarm::store()
{
        // store the data in the active alarm
        // database
        _almActiveDb->add(_almId, this);
}
/*
-------------------------------------------------------
---------------*/
void
Alarm::remove()
{
        // remove the data from the active alarm
        // database
        _almActiveDb->remove(_almId);
}
```

As discussed above, because the central node processor of the invention is the main control point for all calls made to or from a subscriber unit, all billing and accounting functions may be performed by each central node processor of each node, or hub. This is in sharp contrast to conventional systems, both wireless and land-line, which typically implement the call-control and real-time operational activities in software executing on switching-exchange equipment. Thus, information concerning calls, such as caller, dialed digits, start time, call duration, etc., in these prior-art systems, are written periodically to a removable media data-storage device, such as magnetic tape. These magnetic tapes are then shipped, according schedule, to a billing-data processing center, where the information is used to compute the charges to be levied for each system-user. This information is then printed on an invoice and mailed to each user to obtain payment. The system of the invention uses a significantly different approach to the process of obtaining call-charge information, in order to provide capabilities that are not possible with the prior-art systems.

As discussed above, the system of the invention uses a system-architecture such that all high-level call-processing intelligence resides on the system-controller, which, in the preferred embodiment, is a personal computer, in contradistinction to the switching equipment of prior-art systems. Billing data is a computationally task which is readily performed by the personal computer of the system of the invention that controls all aspects of call-connection. In the present invention, instead of collecting data and storing it on tape, the node-controller, which is a personal computer, passes call-information data directly to a call-accounting process that is run on that node-processor, whereby call-charges are determined as the call takes place, so that there is no time-lag between the end of a call and the cost thereof and the ability to charge for it. This call-accounting process uses look-up tables to determine the charge associated with each call. The call-accounting process can then generate reports on demand, which detail call-charges for each customer, as well as summary-reports for the entire system-user population. These look-up tables are indexed-based by subscriber, as well as by dialed digits, which allows charges to be computed based on air-time rate-plans, as well as by the destination of the call. Such look-up tables are traditional, and well-known.

The real-time, call-accounting capability provided by the system of the invention offers a number of advantages to service-providers of wireless telephony. One such advantage is immediate account-status, which is provided at any time. The system-operator may view revenue-generation of the system as it occurs, rather than having to wait until the end of a billing cycle, when a report from an extraneous billing center sends its reports, as in prior-art systems. The system-operator may, also, view the actual amount that a particular subscriber-user owes, and generate an invoice. The system-operator may also use the centralized, real-time, billing center to audit the operational integrity of the centralized billing center of the invention, in order to ensure that the billing center is correctly processing all call-activities for producing invoices of proper amounts. In addition, the system of the invention also allows the system operator to set a predetermined, monetary limit for each subscriber. When a subscriber places a call, the amount of that call is decremented from this limit. When the amount is zero, the subscriber is blocked from making or receiving any further calls on the system. Thus, the system-operator does not have to provide service to its users based on credit, as is typical of most prior-art systems. By setting a limit to that amount deposited by the customer, the system prevents the user from running up large bills, and then failing to pay them, which is the singularly most major source of revenue loss to wireless system operators.

Since, as described above, each central node-processor is backed-up by another node-processor of a different hub, if the billing and accounts-management functions of one node-processor fails or is down, another node-processor of the network-grid may assume its functions, thus avoiding loss of billing function, and achieving such back-up relatively easily and instantaneously.

Figure 9:
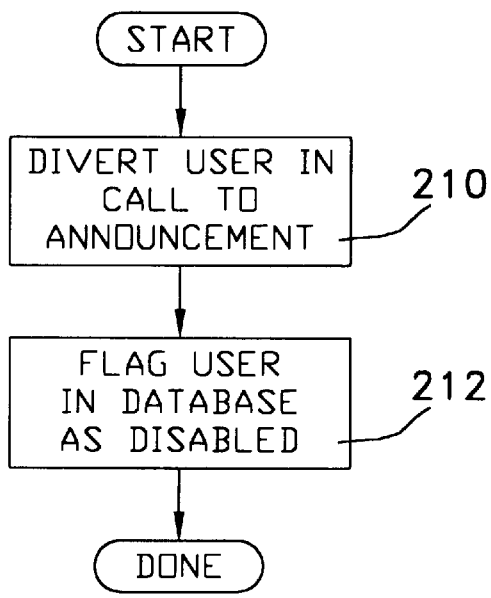
Figure 10:
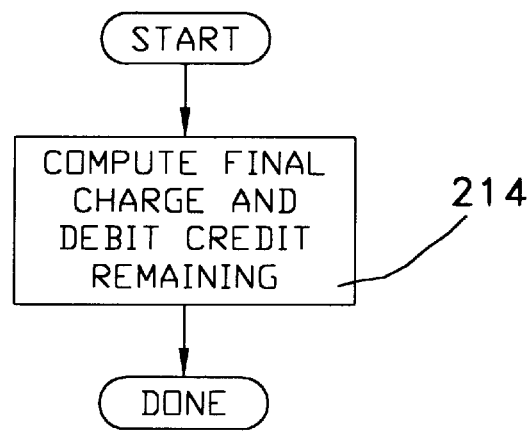

Referring to FIGS. 9–11, there is shown the call-flow logic associated with the billing and accounts portion of the invention. During call set-up, the user is validated, as described above with reference to the "Call-Processing Objects" software in FIG. 3A, Block 30. If the user is a valid one (block 200), then the system checks to see if the call is inbound or outbound (block 202). If it is an outbound call, which is a call to the PSTN, then the system analyzes the dialed digits to determine the rate per minute to be charged for the long distance portion of the call (block 204). This rate is based on the system's finding a match between the dialed digits and toll plans, or rate-tables, configured by the system operator. For example, 01144 might identify a single rate plan for all calls placed to the United Kingdom from a U.S.-based system. The system then computes the rate-per-minute to be charged for airtime usage (block 206). This rate is based on a plan identified in the user's profile in the system's subscriber base, discussed above. The composite rate of the toll-charge and airtime charge is used to compute how long the call can be left up, based on the user's available credit at the start of the call. The system activates a software-timer for the call with the duration set to this time-value (block 208). The rate-tables for the call-accounting process are look-up tables for determining the charge associated with each call. These look-up tables are indexed-based by subscriber, as well as by dialed digits, which allows charges to be computed based on air-time rate-plans, as well as by the destination of the call. Such look-up tables are traditional, and well-known. If the call is an inbound call, meaning an intra-cellular call not needing the PSTN has been made, then the charge computed is based solely on the airtime charge (block 206).

Referring to FIG. 10, there is shown the call-logic associated with the scenario where the call is still in progress, when the previously-activated software-timer has expired. The user is diverted to an announcement that typically informs him that he can no longer obtain service until his account has been settled (block 210). The system also set a "user-disabled" flag in the subscriber data base, preventing further placements of calls (block 212).

Referring to FIG. 11, there is shown what happens when the user hangs up before the timer expires. n this case, the system computes the final charge for that call based on the final call-duration, and debits the user's account with that amount (block 214).

The software listing for the billing and accounts-management discussed above is shown hereinbelow.

```
JUN. -21 96(FRI) 14:36   PHOENIX WIRELESS GR        TEL:14076671101                    P. 006

To:        gullifor @ pwgi.com @ inet
cc:        (bcc: Dan Gulliford/Phoenix Wireless Group Inc)
From:      chris @ wormhole.pwgi.com (Chris Matthies) @ inet
Date:      06/20/96  03:31:05 PM
Subject:   whinnnnnning

- - - - - - - - - - - -
X-Sun-Data-Type: text
X-Sun-Data-Description: text
X-Sun-Data-Name: text
X-Sun-Charset: us-ascii
X-Sun-Content-Lines: 1

Here is the stuff......
- - - - - - - - - -
X-Sun-Data-Type: default
X-Sun-Data-Description: default
X-Sun-Data-Name: PicCntrl.C
X-Sun-Charset: us-ascii
X-Sun-Content-Lines: 165 include "picmain/PicCntrl.h"
include "ttLib/ttipc.h"
#include "odbms/RatePlanDb.h"
#include "share/phnx2appmsg.h"
#include "share/app2phnxmsg.h"
#include "picmain/WdgTip.h"
include <time.h> implementActionCallback(PicCntrl)
extern TTIPC       *ipc;
extern WdgTip      *wdgtip;
static const int PosOffSet = 5;

/*
-------------------------------------------------------------------------
*/
PicCntrl::PicCntrl()
{

}
/*
-------------------------------------------------------------------------
*/
```

```
PicCntrl::~PicCntrl()
{
        delete _rpdb;
}
/*
------------------------------------------------------------------------
*/
int
PicCntrl::init(Ol_d_tech *tobj, const char *hname)
{
        // init the handle to the top level OI object
        _topObj = tobj;

// remove the help from the menu of the System status window since no
        // one object actually owns it
        Ol_app_window *appwin = (Ol_app_window *)_topObj;
        appwin->help_menu()->del();

// register ipc handler
        _register_handler();

// connect to the database
        _rpdb = new RatePlanDb;
        if ( !_rpdb->initialize() ) {
                _error_msg_popup("Could not open Rate Plan Database!!!\n" );
                ipc->create_msg();
                *ipc << "picmain" << "Error (Plan DB)";
                ipc->send_msg(App2PhnxAppStatus);
                ::exit(-1);
        }

// set the site name and display to the user
        _siteName = hname;
        SPString nodestr = "Node: ";
        nodestr        += _siteName;
        appwin->set_state_str(nodestr);

return 1;
}
/*
------------------------------------------------------------------------
*/
RatePlanDb *
PicCntrl::plan_db()
{
```

```
        return _rpdb;
}
/*
-----------------------------------------------------------------
*/
void
PicCntrl::exit(OI_menu_cell *cellp, void *vp, OI_number bnum)
{
        cellp,vp,bnum;
        if (cellp->selected()) {

// close the connection with the OI interaction loop
                OI_end_interaction();

}
}
/*
-----------------------------------------------------------------
*/
void
PicCntrl::option_select(OI_menu_cell *cellp, void *vp, OI_number bnu)
{
        cellp, vp, bnu;

OI_dialog_box *dboxp;
        int which = ::atoi((char *)vp);
        if (cellp->selected()) {
                switch (which) {
                case 0: {
                        dboxp = (OI_dialog_box
*)_topObj->descendant("dbg_state_legend_win");
                        if ( dboxp->state() != OI_active ) {
                                dboxp->set_loc(PosOffSet, PosOffSet);
                                dboxp->set_state(OI_active);
                        }
                        break;
                }
                case 1:
                        wdgtip->set_help(1);
                        break;
                case 2:
                        wdgtip->set_audio(1);
                        break;
                case 3:
                        wdgtip->set_language(WdgTip::English);
                        break;
```

```
                case 4:
                        wdgtip->set_language(WdgTip::Spanish);
                        break;
                case 5:
                        wdgtip->set_language(WdgTip::Bangali);
                        break;
                }
        }
        else {
                switch (which) {
                case 0:
                        break;
                case 1:
                        wdgtip->set_help(0);
                        break;
                case 2:
                        wdgtip->set_audio(0);
                        break;
                }
        }
}
/*
----------------------------------------------------------------
void
PicCntrl::phnx_exit_handler()
{
        // close the connection with the OI interaction loop
        OI_end_interaction();
}
/*
----------------------------------------------------------------
*/
int
PicCntrl::_error_msg_popup(const char *label)
{
        OI_error_dialog_box *edboxp = (OI_error_dialog_box
*)_topObj->descendant("error_popup");
        edboxp->set_title("Error");
        edboxp->set_text_to_string(label);
        edboxp->set_fg_color("red");

OI_button_menu *bmenup = (OI_button_menu *)edboxp->descendant("@buttons");
        bmenup->set_size_track(OI_size_track_none);
        OI_menu_cell *bmcellp = (OI_menu_cell *)bmenup->descendant("@help");
```

```
        if ( bmcellp ) bmcellp->del();

XBell(((OI_app_window *)_topObj)->display(), 0); // ring the bell to warn the user
        OI_menu_cell *cellp;
        if ( cellp = edboxp->wait_button(OI_yes) ) {
                if ( !::strcmp(cellp->name(), "OK") ) {
                        return 1;
                }
        }
        return 0;

}
/*
------------------------------------------------------------------------
*/
void
PicCntrl::_register_handler()
{
        // create an action object
        ipc->register_msg_callback(Phnx2AppExiting,
            new ActionCallback(PicCntrl)(this, &PicCntrl::phnx_exit_handler));
}
----------
X-Sun-Data-Type: default
X-Sun-Data-Description: default
X-Sun-Data-Name: CdrRptGen.C
X-Sun-Charset: us-ascii
X-Sun-Content-Lines: 275 include <OI/oi.H>
include <stdlib.h>
#include <time.h>
#include <stdlib.h>
#include "billLib/CdrRptGen.h"
#include "odbms/SubsRecsDb.h"
#include "share/wacsconst.h"

OTCLIB_STATIC_TRACETAG(SUBSPROC_TRACE);
#ifdef min
#undef min
#endif

/*
------------------------------------------------------------------------
*/
CdrRptGen::CdrRptGen()
```

```
        : _subsrecsDb(0)
{
}
/* ----------------------------------------------------------------- */
CdrRptGen::~CdrRptGen()
{
        delete _subsrecsDb;
}
/* ----------------------------------------------------------------- */
int
CdrRptGen::initialize(const char *dname)
{
        // create a toll charge object for database connection
        _subsrecsDb = new SubsRecsDb;
        if ( !_subsrecsDb->initialize(dname)  ) {
                OTCLIB_TRACER(SUBSPROC_TRACE) << "Could not open Subscriber Record
Database!!!\n" ;
                exit(-1);
        }

// create a temporary file name for use in report name
        char *tbuf  = "BillingCycleReportXXXXXX";
        _rptname    = "/tmp/";
        _rptname   += mktemp(tbuf);

return 1;
}
/* ----------------------------------------------------------------- */
void
CdrRptGen::remove_db()
{
        _subsrecsDb->remove_db();
}
/* ----------------------------------------------------------------- */
void
CdrRptGen::print_report_ps(const char *rpt)
{
```

```
        // open a report file using the date
        // default to current date
        SPString rptname;
        if ( rpt )    rptname = rpt; else rptname = _rptname;

// process the report into postscript and print
        SPString cmd;
        cmd << "groff -t -mgm " << rptname << " > " << rptname << ".pr";
        Ol_fork(cmd);
        cmd = "";
        cmd    << "lp " << rptname << ".pr > /dev/null 2>&1 ";
        Ol_fork(cmd);
}
/*
------------------------------------------------------------------------
*/
void
CdrRptGen::print_sub_report_ps(const char *rpt)
{
        // open a report file using the date
        // default to current date
        SPString rptname;
        if ( rpt )    rptname = rpt; else rptname = _rptname;

// process the report into postscript and print
        SPString cmd;
        cmd << "groff -t -mgm " << rptname << " > " << rptname << ".pr";
        Ol_fork(cmd);
        cmd = "";
        cmd    << "lp " << rptname << ".pr > /dev/null 2>&1 ";
        Ol_fork(cmd);
}
/*
------------------------------------------------------------------------
*/
void
CdrRptGen::store_report_ps(const char *rpt)
{
        // open a report file using the date
        // default to current date
        SPString rptname = _rptname;

// process the report into postscript and print
        SPString cmd;
        cmd << "groff -t -mgm " << rptname << " > " << rpt;
        Ol_fork(cmd);
```

```
}
/*
 * ---------------------------------------------------------------
 */
void
CdrRptGen::store_sub_report_ps(const char *rpt)
{
    // open a report file using the date
    // default to current date
    SPString rptname = _rptname;

// process the report into postscript and print
    SPString cmd;
    cmd << "groff -t -mgm " << rptname << " > " << rpt;
    OI_fork(cmd);
}
/*
 * ---------------------------------------------------------------
 */
void
CdrRptGen::store_report_ascii(const char *rpt)
{
    // open a report file using the date
    // default to current date
    SPString rptname = _rptname;

// process the report into postscript and print
    SPString cmd;
    cmd << "cp " << rptname << " " << rpt;
    OI_fork_nowait(cmd);
}
/*
 * ---------------------------------------------------------------
 */
void
CdrRptGen::generate_report_ps(const char *rpt)
{
    // open a report file using the date
    SPString rptname;
    if ( rpt )   rptname = rpt; else rptname = _rptname;

// print report header
    ofstream ofs(rptname);
    _generate_header_ps(ofs);

// now loop through all billing records
```

```
        // and print totals
        float systotal = 0.0;
        int   reset = 1;
        while ( _subsrecsDb->next_entry(reset) ) {
                OI_flush();
                reset = 0;
                systotal += _generate_entry_ps(ofs);
        }

// print the end of page and total
        _generate_trailor_ps(ofs, systotal);

ofs.close();

}
/*
.........................................................................
*/
void
CdrRptGen::generate_report_ascii(const char *rpt)
{
        // open a report file using the date
        SPString rptname;
        if ( rpt )    rptname = rpt; else rptname = _rptname;

// now loop through all billing records
        // and print totals
        ofstream ofs(rptname);
        float systotal = 0.0;
        int   reset = 1;
        while ( _subsrecsDb->next_entry(reset) ) {
                OI_flush();
                reset = 0;
                char obuf[1024];
                // calculate the total for all entries
                float total = _subsrecsDb->local_total() + _subsrecsDb->long_dist_total() +
_subsrecsDb->other_total();
                ::sprintf(obuf,"%s,%s,%f,%f,%f,%f", _subsrecsDb->name(),
_subsrecsDb->min(),
                                _subsrecsDb->local_total(), _subsrecsDb->long_dist_total(),
                                _subsrecsDb->other_total(), total);
                ofs << obuf;

}
        ofs.close();
```

114

```
}
/*
 ............................................................
 */
void
CdrRptGen::_generate_header_ps(ofstream &ofs)
{
        _create_time_label(NoUnderscore);
        char oname[1024];
        ::sprintf(oname,".PH \"\"\\fB\\s14Phoenix Wireless Group, Inc.\\fR\\s12\"Date: %s'\"\n",
                        (const char *)_timelabel);
        ofs << oname;
        ofs << ".PF \"\"Page % \"\n";
        ofs << ".VM 0\n";
        ofs << ".ps 16\n";
        ofs << ".sp -1\n";
        ofs << ".ps 14\n";
        ofs << ".sp 4\n";
        ofs << ".ce\n";
        ofs << "\\fB\\s16Billing Cycle Report\\fR\\s12\n";
        ofs << ".sp 2\n";
        ofs << ".TS H\n";
        ofs << "tab(;);\n";
        ofs << "lw(4i) l l.\n";
        ofs << ".P\n";
        ofs << "\\fBAccounts;Charge;Amount\\fR\n";
        ofs << ".P\n";
        ofs << "_;_;_\n";
        ofs << ".TH\n";
}
/*
 ............................................................
 */
float
CdrRptGen::_generate_entry_ps(ofstream &ofs)
{
        ofs << ".sp\n";

// build report
        char obuf[1024];
        ::sprintf(obuf,"Name:   %s;Local;%f\n", _subsrecsDb->name(),
_subsrecsDb->local_total());
```

```
        ofs << obuf;

::sprintf(obuf,"Phone: %s;Long Distance;%f\n", _subsrecsDb->min(),
_subsrecsDb->long_dist_total());
        ofs << obuf;

::sprintf(obuf,"%s;Other;%f\n", " ", _subsrecsDb->other_total());
        ofs << obuf;

//      ofs << "Account #  1234567890;;\n";

ofs << "_;_\n";
        ofs << ".P\n";

// calculate the total for all entries
        float total = _subsrecsDb->local_total() + _subsrecsDb->long_dist_total() +
                _subsrecsDb->other_total();
        ::sprintf(obuf,"%s;Total;%f\n", " ", total);
        ofs << obuf;

ofs << ".sp\n";
        ofs << "_;_\n";

return total;

}
/*
-------------------------------------------------------------------
*/
void
CdrRptGen::_generate_trailor_ps(ofstream &ofs, float systotal)
{
        ofs << ".TE\n";
        ofs << ".sp\n";
        ofs << ".in 4.35i\n";
        ofs << ".TS\n";
        ofs << "box, tab(;);\n";
        ofs << "l r.\n";
        ofs << ".P\n";

char obuf[1024];
        ::sprintf(obuf,"\\fBCycle Total:;%f\\fR\n", systotal);
        ofs << obuf;

ofs << ".P\n";
        ofs << ".TE\n";
```

```
}
/*
 *-------------------------------------------------------------------------
 */
void
CdrRptGen::_create_time_label(int type)
{
        char    timestring[30];
        timeval         cur_time;
        ::gettimeofday (&cur_time, 0);
        if ( type == Underscore )
                ::cftime(timestring,"%b_%d_%Y", &(cur_time.tv_sec));
        else if ( type == NoUnderscore )
                ::cftime(timestring,"%b %d %Y", &(cur_time.tv_sec));
        _timelabel = timestring;
}
```

While a specific embodiment of the invention has been shown and described, it is to be understood that numerous changes and modifications may be made therein without departing from the scope, spirit and intent of the invention as set forth in the appended claims.

What I claim is:

1. A wireless telephone system comprising:

a plurality of cell-sites, each cell-site having a base-station and a number of mobile-subscribers linked to said base station;

a central adjunct node-processor linking together said plurality of cell-sites, and controlling all call-processing functions and operations between said plurality of cell-sites and the public switched telephone network;

said adjunct node-processor comprising a computer having memory means for storage of data; said memory means comprising control means for controlling call-processing of a telephone call between a said mobile-subscriber and the public switched telephone network; and said memory means further comprising billing means for initiating the start of the billing time-period for a call associated with a said mobile-subscriber, and terminating the billing time-period upon termination of the call; said billing relatively-instantaneously recording and tracking the billing of each said mobile-subscriber;

said billing means comprising limit constraint means for determining the need to terminate a call while the call is in progress, and termination means operatively coupled to said constraint means for terminating the call while in progress upon the determination by said constraint means of a predefined constraint for the call in progress having been violated during said call in progress.

2. The wireless telephone system according to claim 1, wherein said limit constraint means comprises means for generating at least one of a toll-rate charge based on the dialed digits and an airtime-rate charge based on the user's rate-plan; said termination means for terminating said call in progress comprising a timer that is set based upon a value indicative of said available credit of the user.

3. The wireless telephone system according to claim 2, wherein said timer of said termination means terminates the call based upon said means for generating at least one of a toll-rate charge and an airtime-rate charge having debited the account of said user the amount equal to said value by which said timer had been set.

4. A method of continuously billing a call made on a wireless telephone system, said wireless telephone system comprising a plurality of cell-sites, each cell-site having a base-station and a number of mobile-subscribers linked to said base station: a central adjunct node-processor linking together said plurality of cell-sites, and controlling all call-processing functions and operations between said plurality of cell-sites and the public switched telephone network; said adjunct node-processor comprising a computer having memory means for storage of data: said memory means comprising control means for controlling call-processing of a telephone call between a said mobile-subscriber and the public switched telephone network; and said memory means further comprising billing means for initiating the start of the billing time-period for a call associated with a said mobile-subscriber, and terminating the billing time-period upon termination of the call, said method comprising:

(a) initiating said billing means of said central adjunct node-processor for start of the billing time-period for a call associated with a mobile-subscriber after the call has been connected, and terminating said billing means of said central adjunct node-processor to terminate the billing time-period upon termination of the call;

(b) relatively-instantaneously recording and tracking the billing of said mobile-subscriber of said step (a) while said call is in-progress;

(c) automatically terminating the mobile call while in-progress via said billing means of said central adjunct node-processor if the available credit of the user who has made the call has been used up.

5. The method of continuously billing a call made on a wireless telephone system according to claim 4, wherein said step (b) comprises setting a software timer based on the available credit of the user at the time the call is initiated; said step (c) being performed when said software time has expired.

* * * * *

UNITED STATES PATENT AND TRADEMARK OFFICE
CERTIFICATE OF CORRECTION

PATENT NO : 5,966,649
DATED : October 12, 1999
INVENTOR(S) : Philip C. Gulliford, Christopher C. Matthies, John Carter, Charles Tsao It is certified that error appears in the above-identified patent and that said Letters Patent is hereby corrected as shown below:

Title page, item
[73]--Assignee: Excel Switching Corporation --

Signed and Sealed this

Thirty-first Day of October, 2000

Attest:

Q. TODD DICKINSON

Attesting Officer

Director of Patents and Trademarks